(12) United States Patent
Amento et al.

(10) Patent No.: US 8,839,327 B2
(45) Date of Patent: Sep. 16, 2014

(54) METHOD AND APPARATUS FOR PRESENTING MEDIA PROGRAMS

(75) Inventors: Brian Amento, Morris Plains, NJ (US); Larry Stead, Upper Montclair, NJ (US); Alicia Abella, Morristown, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 693 days.

(21) Appl. No.: 12/146,131

(22) Filed: Jun. 25, 2008

(65) Prior Publication Data

US 2009/0328122 A1    Dec. 31, 2009

(51) Int. Cl.
H04H 60/33    (2008.01)
H04H 60/32    (2008.01)
G06F 3/00     (2006.01)
H04N 7/173    (2011.01)

(52) U.S. Cl.
USPC ............. 725/110; 725/9; 725/10; 725/13; 725/16; 725/46

(58) Field of Classification Search
USPC .................................. 725/9–21, 46
See application file for complete search history.

(56) References Cited

U.S. PATENT DOCUMENTS

| | | | |
|---|---|---|---|
| 5,223,924 A | 6/1993 | Strubbe | |
| 5,920,694 A | 7/1999 | Carleton et al. | |
| 6,272,231 B1 | 8/2001 | Maurer et al. | |
| 6,357,042 B2 | 3/2002 | Srinivasan et al. | |
| 6,438,579 B1 | 8/2002 | Hosken | |
| 6,567,797 B1 | 5/2003 | Schuetze et al. | |
| 6,580,811 B2 | 6/2003 | Maurer et al. | |
| 6,732,146 B1 | 5/2004 | Miyake | |
| 6,792,412 B1 | 9/2004 | Sullivan et al. | |
| 6,948,131 B1 | 9/2005 | Neven et al. | |
| 7,031,931 B1 | 4/2006 | Meyers | |
| 7,051,352 B1 | 5/2006 | Schaffer | |
| 7,716,376 B1 * | 5/2010 | Price et al. | 709/248 |
| 2002/0010759 A1 | 1/2002 | Hitson et al. | |
| 2002/0059094 A1 | 5/2002 | Hosea et al. | |
| 2002/0097265 A1 | 7/2002 | Kurapati et al. | |
| 2002/0162107 A1 | 10/2002 | Gutta et al. | |
| 2002/0178057 A1 | 11/2002 | Bertram et al. | |
| 2002/0193066 A1 | 12/2002 | Connelly | |
| 2002/0194586 A1 | 12/2002 | Gutta et al. | |
| 2002/0199194 A1 | 12/2002 | Ali | |
| 2003/0066068 A1 | 4/2003 | Gutta et al. | |
| 2003/0101450 A1 * | 5/2003 | Davidsson et al. | 725/32 |
| 2003/0234805 A1 | 12/2003 | Toyama et al. | |
| 2004/0003392 A1 | 1/2004 | Trajkovic et al. | |
| 2004/0064526 A1 | 4/2004 | Lee et al. | |
| 2005/0108767 A1 * | 5/2005 | Ma | 725/105 |
| 2005/0131918 A1 | 6/2005 | Hillis et al. | |
| 2005/0144632 A1 | 6/2005 | Mears et al. | |
| 2005/0149974 A1 | 7/2005 | Norman | |
| 2006/0010246 A1 * | 1/2006 | Schulz et al. | 709/232 |
| 2006/0020614 A1 | 1/2006 | Kolawa et al. | |

(Continued)

*Primary Examiner* — Gigi L Dubasky
(74) *Attorney, Agent, or Firm* — Guntin & Gust, PLC; Ralph Trementozzi

(57) ABSTRACT

A system that incorporates teachings of the present disclosure may include, for example, a system having a controller to collect one or more temporal actions initiated by each of a plurality of users while presenting a media program to said plurality of users, generate one or more symbolic overlays according to the one or more temporal actions collected for each user, and combine the presentation of the media program with a presentation of the one or more symbolic overlays. Other embodiments are disclosed.

34 Claims, 22 Drawing Sheets

(56) References Cited

U.S. PATENT DOCUMENTS

| | | |
|---|---|---|
| 2006/0026502 A1 | 2/2006 | Dutta |
| 2006/0168150 A1 | 7/2006 | Naik et al. |
| 2006/0190966 A1 | 8/2006 | McKissick et al. |
| 2006/0218481 A1 | 9/2006 | Adams, Jr. et al. |
| 2006/0218573 A1* | 9/2006 | Proebstel ................ 725/14 |
| 2006/0259355 A1 | 11/2006 | Farouki et al. |
| 2006/0271997 A1* | 11/2006 | Jacoby et al. ............ 725/135 |
| 2006/0288041 A1 | 12/2006 | Plastina et al. |
| 2007/0011039 A1 | 1/2007 | Oddo |
| 2007/0223871 A1* | 9/2007 | Thelen ..................... 386/52 |
| 2008/0189733 A1* | 8/2008 | Apostolopoulos ........ 725/28 |
| 2009/0249223 A1* | 10/2009 | Barsook et al. .......... 715/753 |

\* cited by examiner

400

2700

METHOD AND APPARATUS FOR PRESENTING MEDIA PROGRAMS

FIELD OF THE DISCLOSURE

The present disclosure relates generally to media presentation techniques and more specifically to a method and apparatus for presenting media programs.

BACKGROUND

Consumers have a number of venues to access media content. For example, consumers can view video content supplied by social networking portals such as MySpace, FaceBook, and YouTube over an Internet browser. Similarly, consumers can view via a set-top box video content supplied by an Internet Protocol Television (IPTV) communication system, a satellite TV communication system, and/or a cable TV communication system. Other forms of media content such as audio content, pictures, articles, or combinations thereof can also be accessed by consumers over a public network such as the Internet.

Consumers can share with others their thoughts about media content they have consumed by word of mouth, text messaging (e.g., email), or other forms of common communication.

DETAILED DESCRIPTION

One embodiment of the present disclosure entails a method involving presenting each of a plurality of users a media program, collecting one or more temporal actions initiated by the plurality of users while the media program is presented, creating one or more symbolic overlays corresponding to the one or more temporal actions of each user, combining the presentation of the media program with a presentation of the one or more symbolic overlays.

Another embodiment of the present disclosure entails a system having a controller to collect one or more temporal actions initiated by each of a plurality of users while presenting a media program to said plurality of users, generate one or more symbolic overlays according to the one or more temporal actions collected for each user, and combine the presentation of the media program with a presentation of the one or more symbolic overlays.

Yet another embodiment of the present disclosure entails a computer-readable storage medium having computer instructions for combining a presentation of a media program with a presentation of one or more symbolic overlays generated from one or more temporal actions collected from a plurality of users while presenting the media program to said plurality of users.

Figure 1:
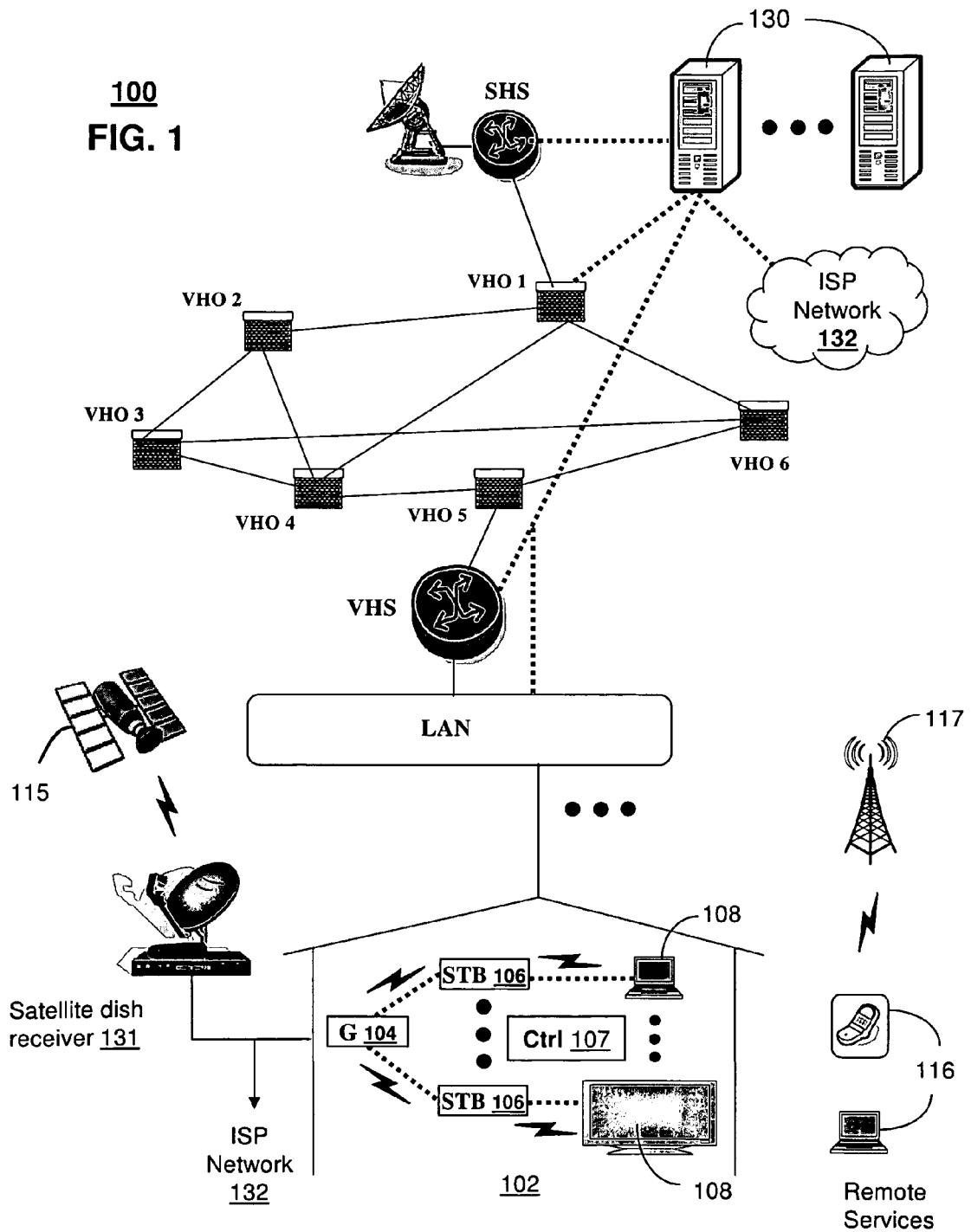
FIGS. 1-6 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. In a typical IPTV infrastructure, there is a super head-end office (SHO) with at least one super headend office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.). In this representative embodiment the computing devices 130 can operate as a proxy system (referred to herein as proxy system 130) for providing portal or like services to a community of subscribers according to the method 700 of FIG. 7, as will be discussed below.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
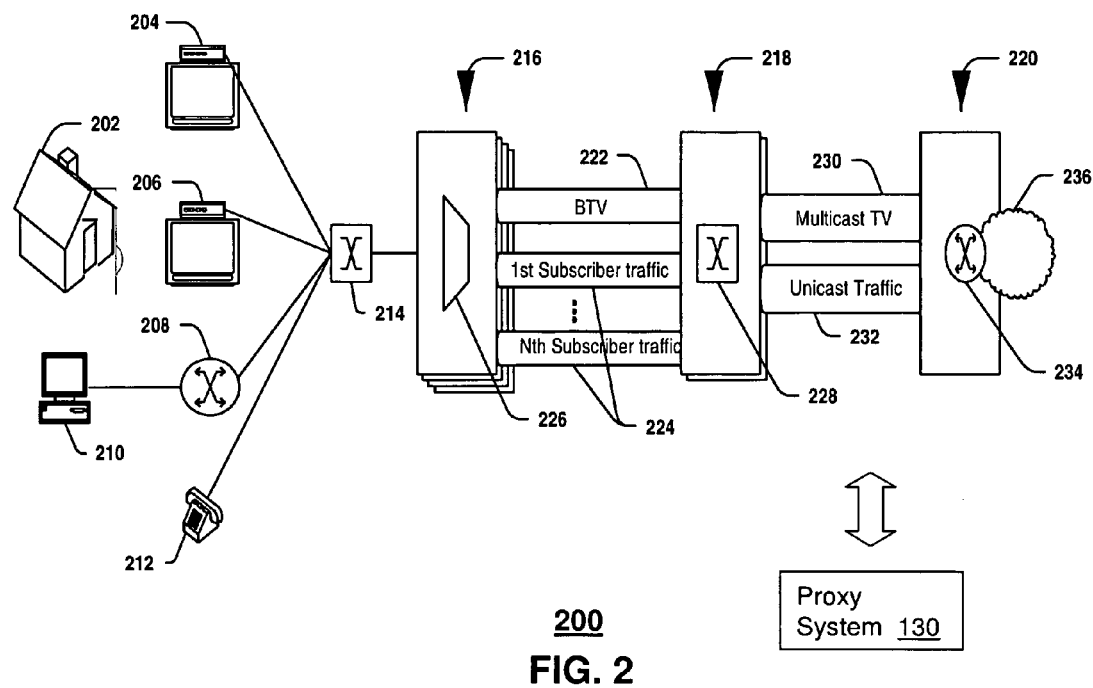

FIG. 2 depicts an illustrative embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remote control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

The proxy system 130 of FIG. 1 can be operably coupled to the second communication system 200 for purposes similar to those described above.

Figure 3:
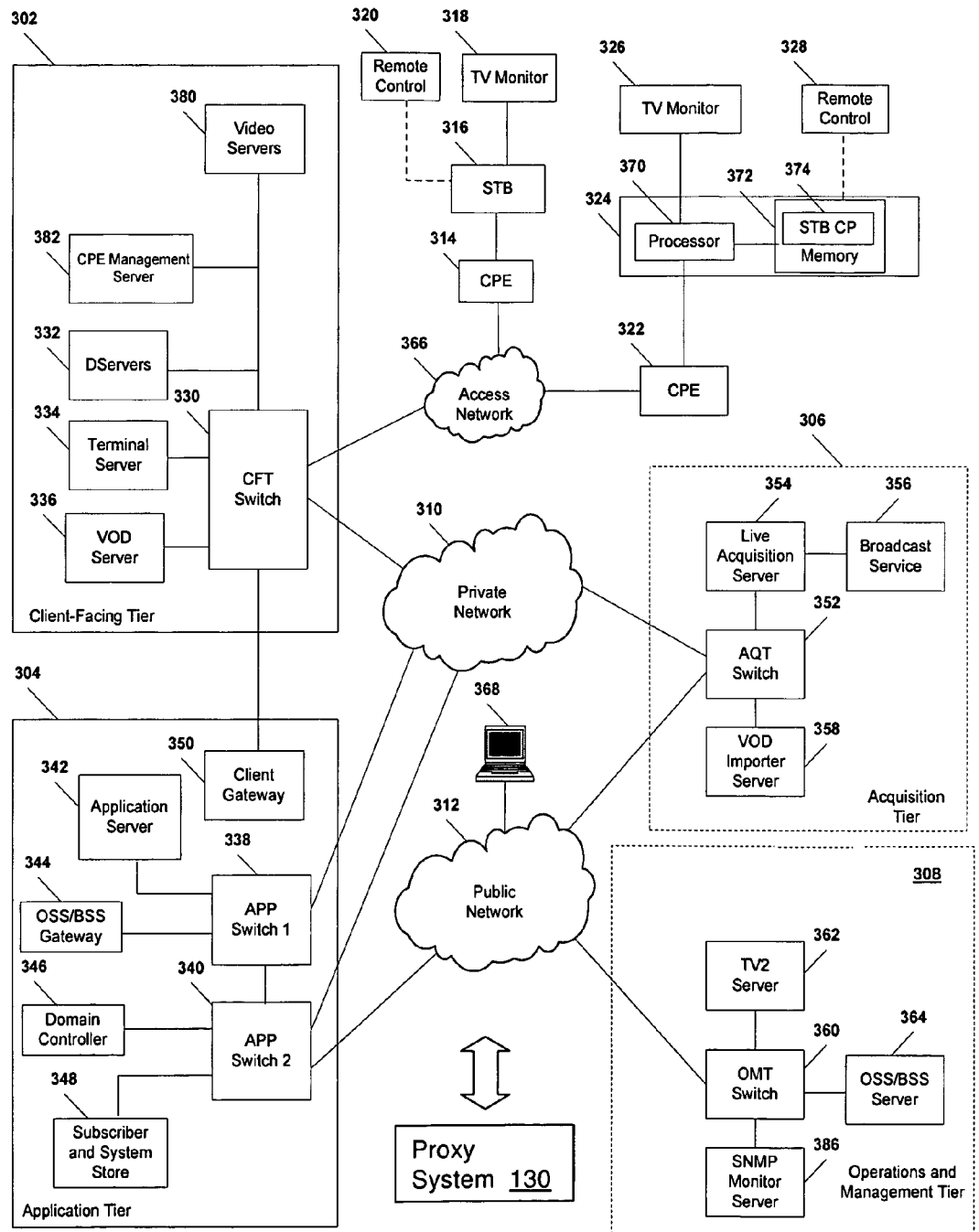

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

The proxy system 130 of FIGS. 1-2 can be operably coupled to the third communication system 300 for purposes similar to those described above.

It should be apparent to one of ordinary skill in the art from the foregoing media communication system embodiments that other suitable media communication systems for distributing broadcast media content as well as peer-to-peer exchange of content can be applied to the present disclosure.

Figure 4:
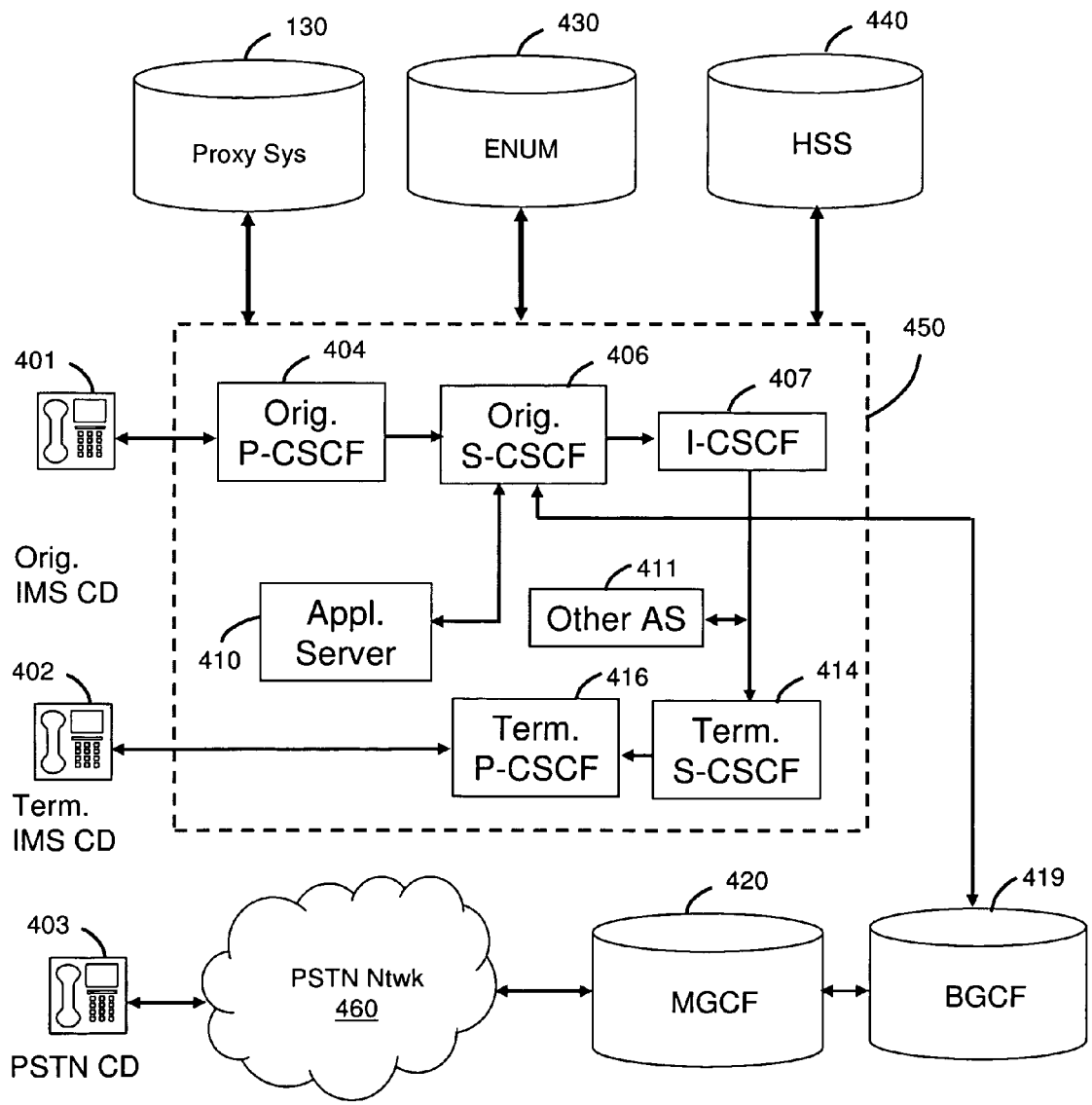

FIG. 4 depicts an illustrative embodiment of a communication system 400 employing an IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) supported by the HSS 440. To accomplish a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

IMS network 450 can also be operably coupled to the proxy system 130 of FIG. 1. In this representative embodiment, the proxy system 130 can be accessed over a PSTN or VoIP channel of communication system 400 by common techniques such as described above.

Figure 5:
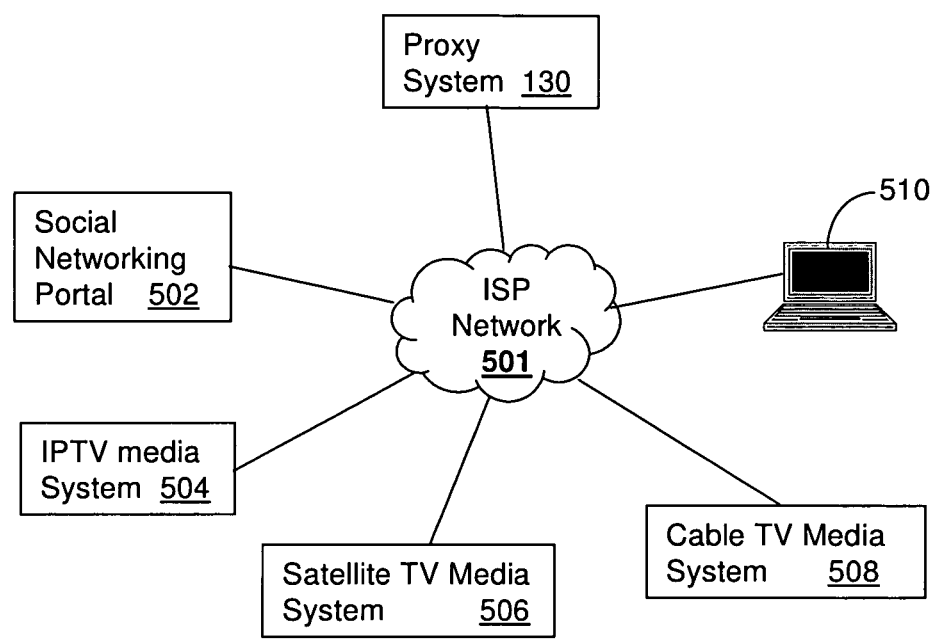

FIG. 5 depicts an illustrative embodiment of a communication system 500 for distributing media content and for collaboratively experiencing media programs distributed by subsystems 502-510. The communication system 500 can comprise one or more social network portals 502 (e.g., YouTube™, FaceBook™, MySpace™, etc.), an IPTV media system 504, a satellite TV media system 506, and/or a cable TV media system 508. Media systems 504-506 can be similar to those described above with the capability of sharing media content over a common ISP network 501. Computing device 510 can represent a laptop computer, a desktop computer, or similar computing device also capable of sharing media content with Internet browsing capability for communicating with the proxy system 130.

Figure 6:
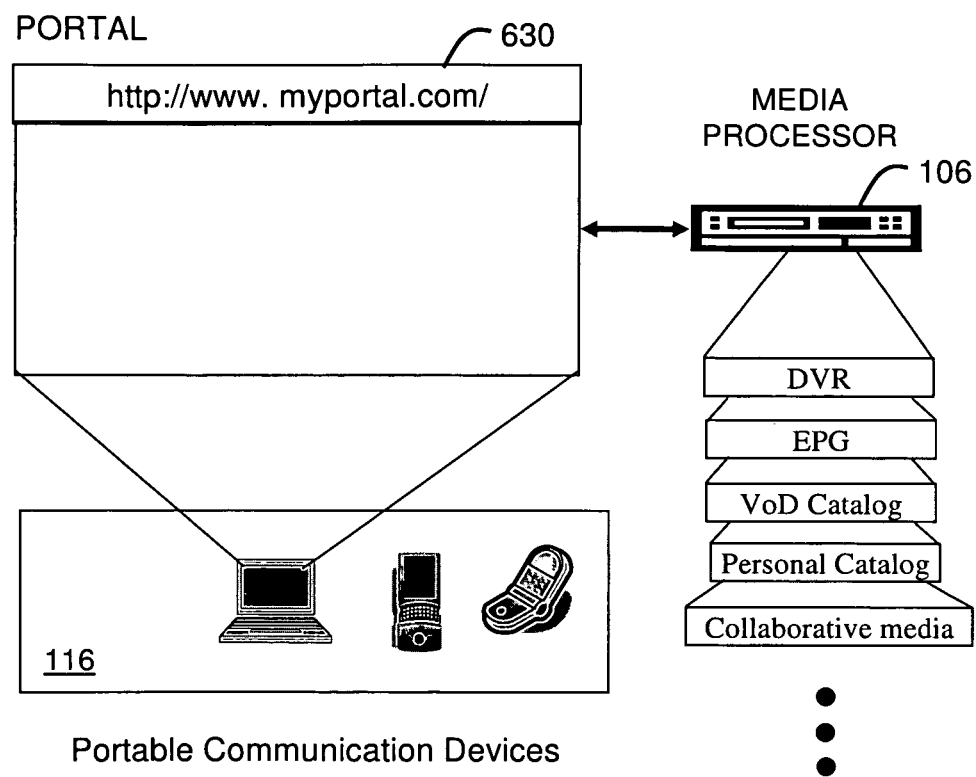

FIG. 6 depicts an illustrative embodiment of a portal 630. The portal 630 can be used for managing services of communication systems 100-600 as well as for collaboratively experiencing media programs distributed by said communication systems. The portal 630 can be accessed by a Uniform Resource Locator (URL) with a common Internet browser such as Microsoft's Internet Explorer using an Internet-capable communication device such as references 108, 116, or 210 of FIGS. 1-2. The portal 630 can be configured to access a media processor such as references 106, 204, 206, 316, and 324 of FIGS. 1-3 and services managed thereby such as a Digital Video Recorder (DVR), an Electronic Programming Guide (EPG), VoD catalog, a personal catalog stored in the STB (e.g., personal videos, pictures, audio recordings, etc.), collaborative media communications as depicted by method 700 of FIG. 7, and so on.

Figure 7:
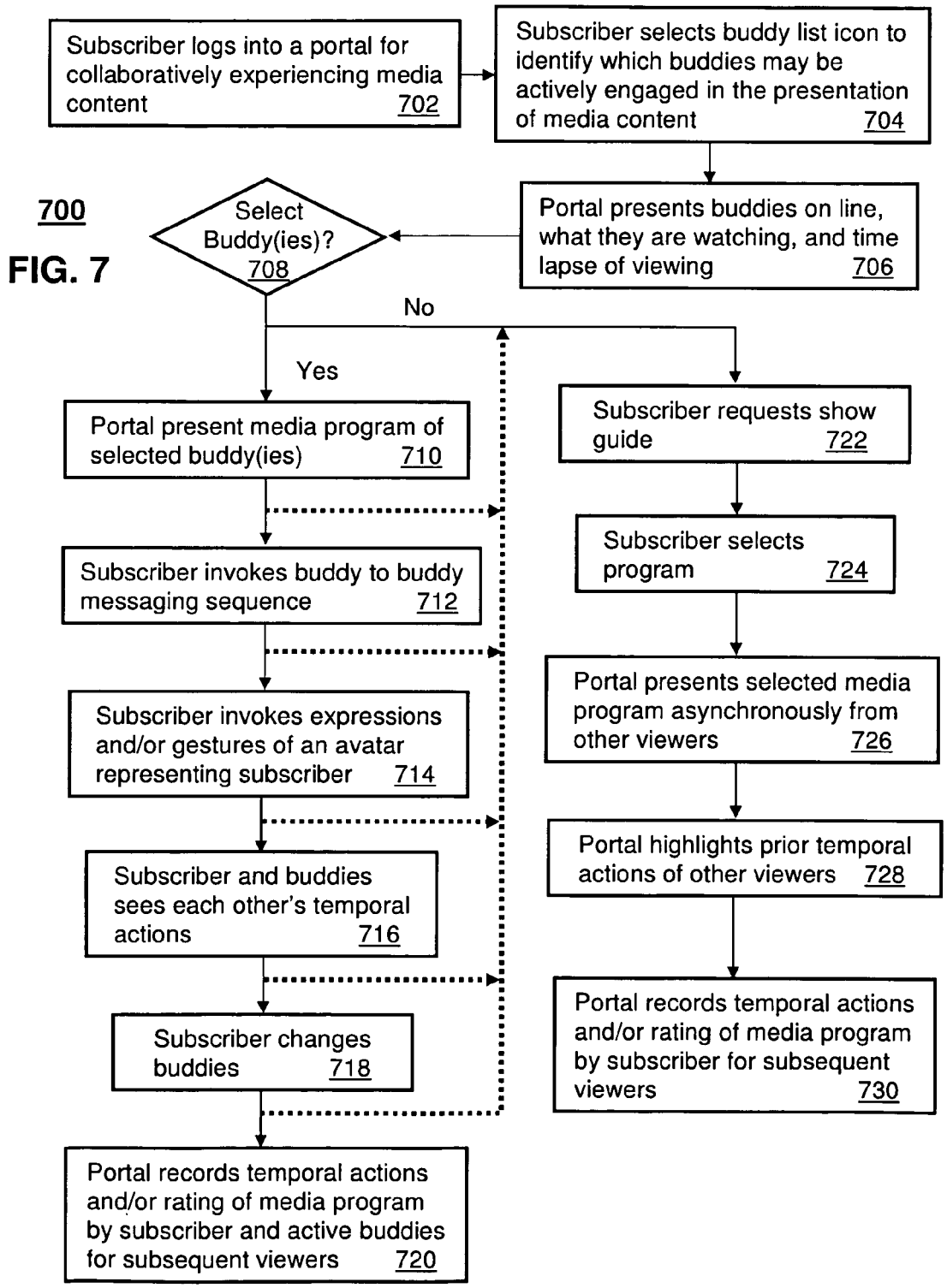
FIG. 7 depicts an illustrative method operating in portions of the communication systems of FIGS. 1-6.
Figure 8:
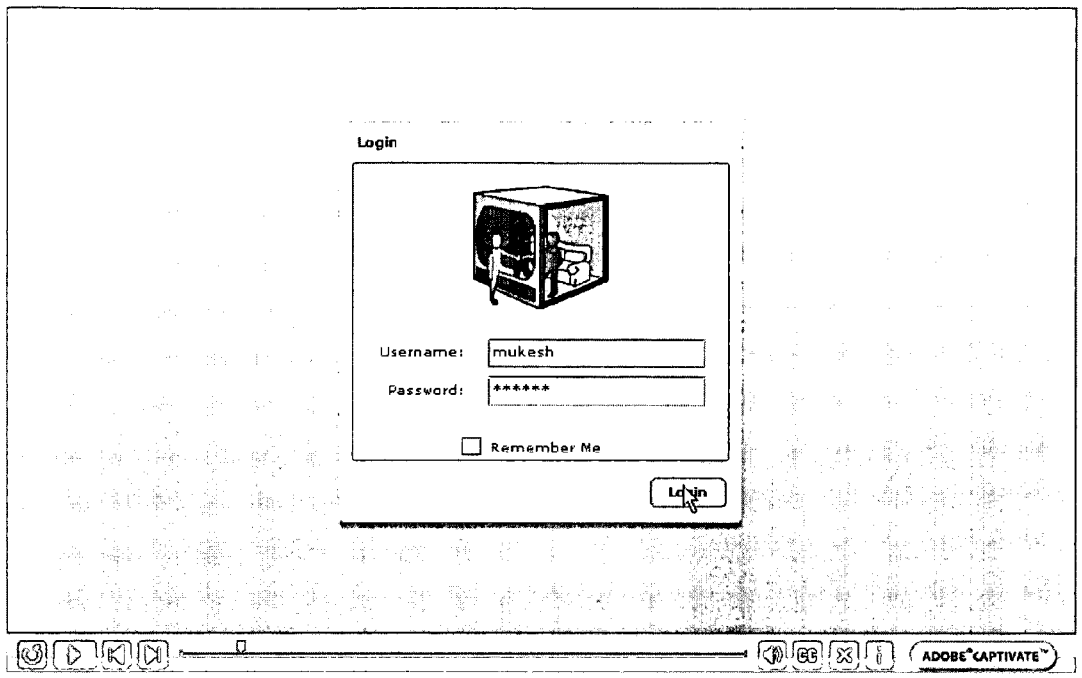
FIGS. 8-30 depict illustrative embodiments of the method of FIG. 7.

FIG. 7 depicts an illustrative method 700 operating in portions of communication systems 100-600. FIGS. 8-30 depict illustrative embodiments of method 700. Method 700 begins with step 702 in which a subscriber logs into a portal such as depicted in FIG. 6 (or a proxy system exclusively configured for collaborative media communications). FIG. 8 depicts an illustrative graphic user interface (GUI) for logging into the portal. The login process can take place once a user becomes a subscriber of the portal using a common registration process.

Figure 9:
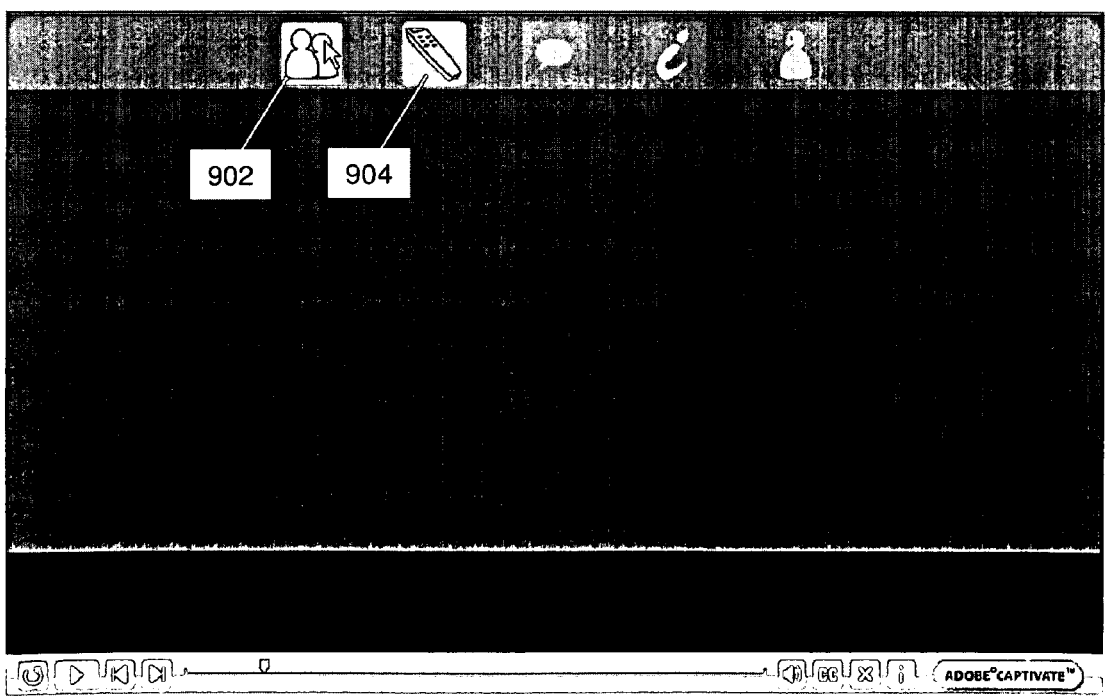

Once the subscriber has logged into the portal, the portal presents the subscriber a collaborative GUI screen with selectable icons such as shown in FIG. 9. At this stage, the subscriber can select in step 704 a buddy list icon 902 to determine which buddy or buddies are actively engaged in the presentation of media content. Media content in the present context can represent audio content (e.g., music), still image content (e.g., pictures), moving image (e.g., video), or combinations thereof. For illustrative purposes only, media content referred to by method 700 will represent video content.

Figure 10:
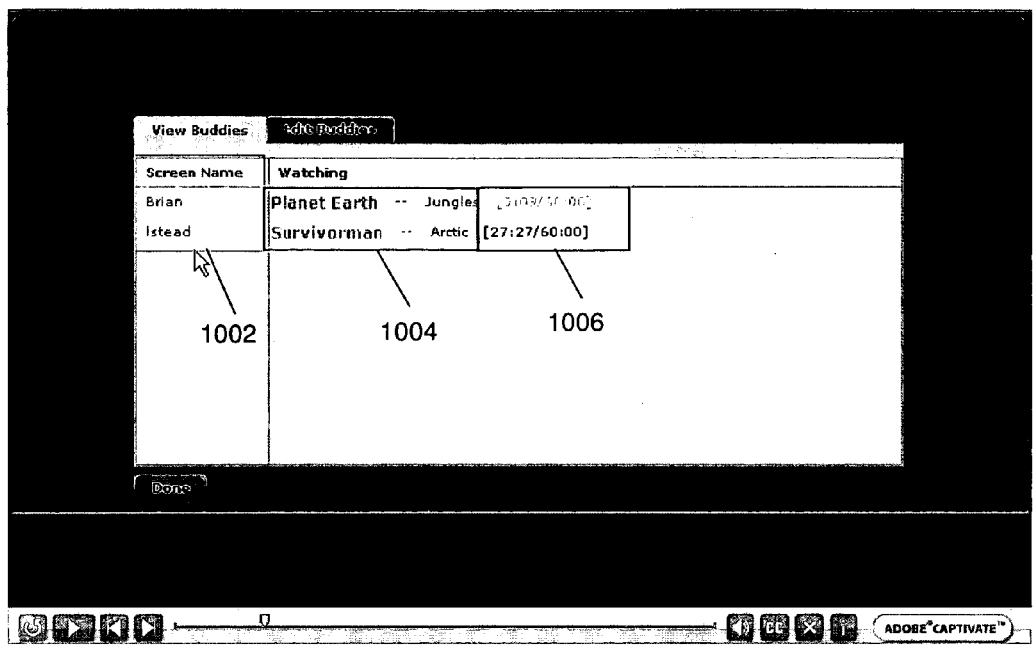

In step 706, the portal presents a GUI such as shown in FIG. 10 that depicts which buddies are actively engaged in a presentation of video content. In this illustration, there are two buddies (Brian and Lstead) depicted in section 1002. Each buddy is viewing different video programs (Planet Earth, and Survivorman) depicted in section 1004. The GUI also shows how much time has lapsed since the video program was initiated by each buddy as depicted in section 1006. Assume that in step 708 the portal detects that the subscriber has selected what Brian is viewing. Responsive to this selection, the portal presents the subscriber in step 710 the media program from the point at which the Brian is viewing the program, thereby synchronizing the viewings of the subscriber and Brian as depicted in FIG. 11.

Figure 11:
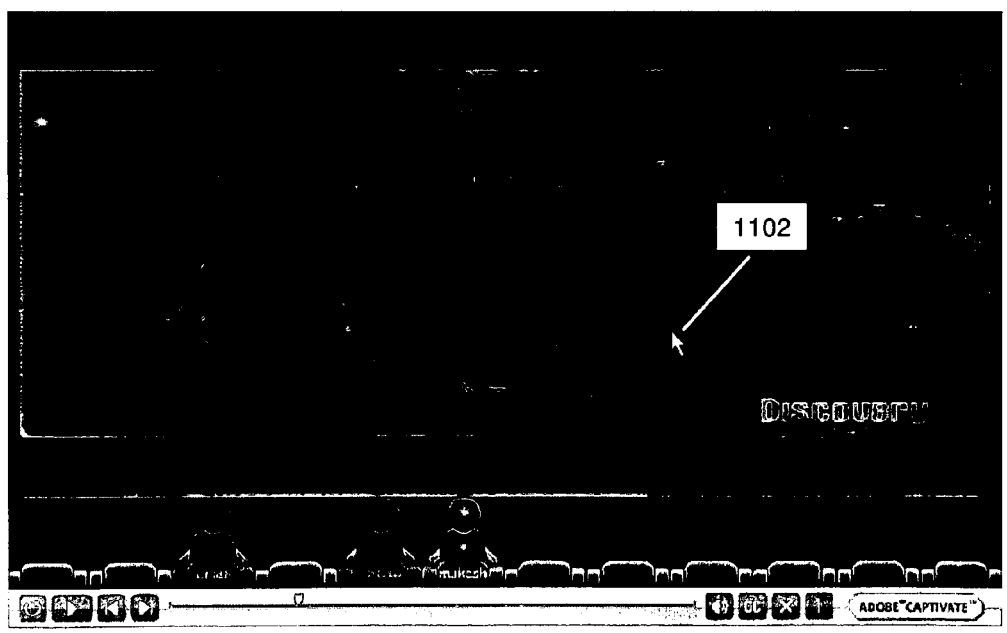
Figure 12:
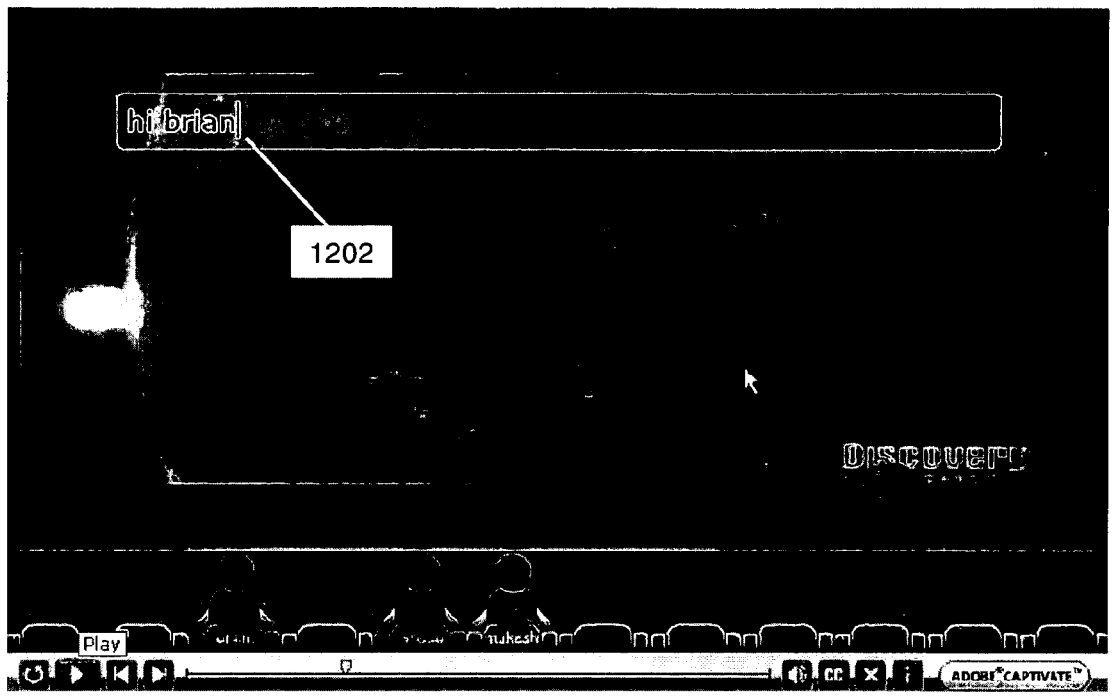
Figure 13:
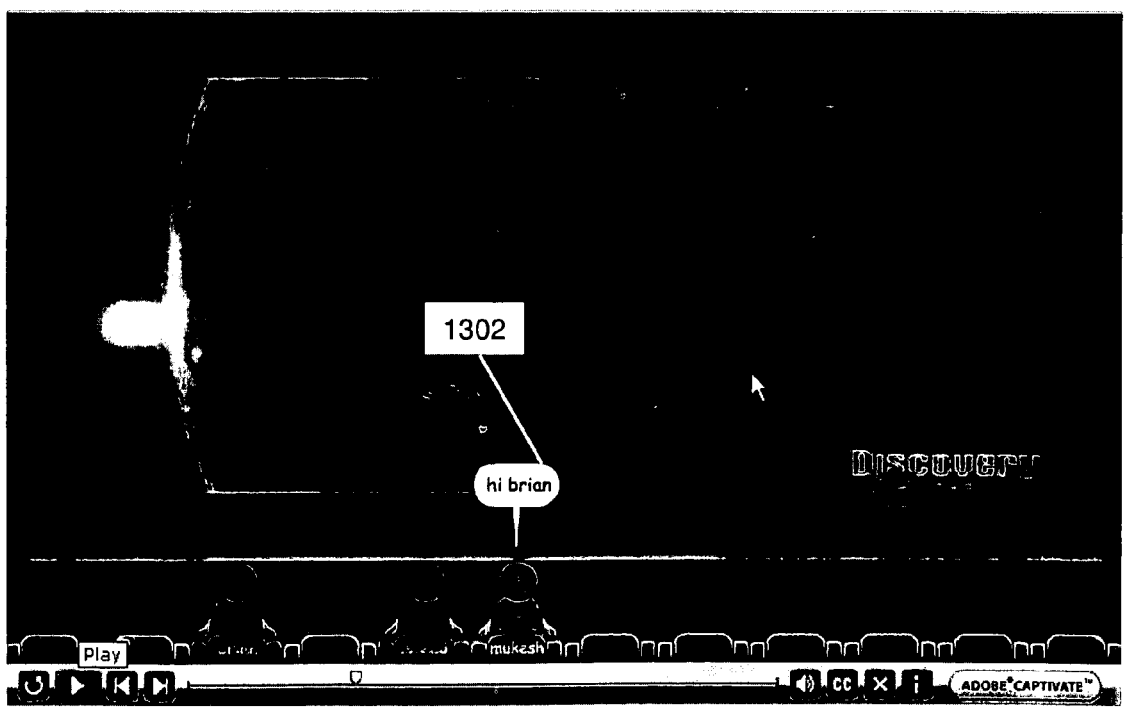
Figure 14:
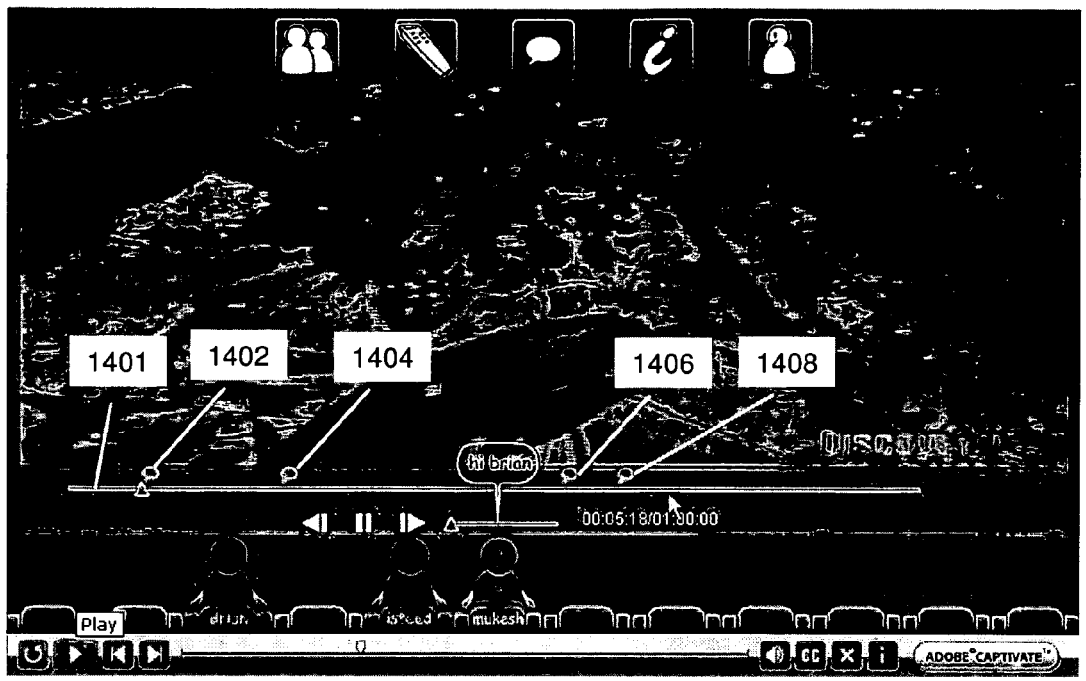
Figure 15:

The GUI of FIG. 11 shows the media program overlaid with a virtual audience of avatars (actual pictures of the subscribers could have been used in lieu of the avatars, if available). In step 712, the subscriber can invoke a temporal action such as a buddy to buddy messaging sequence by selecting any portion of the media program canvas with a mouse pointer 1102. The subscriber can then begin to type a message on screen such as shown in FIG. 12 depicted by reference 1202. Once the message is complete, the subscriber can submit the message by selecting the enter button on his/her keyboard, which invokes a call out symbol 1302 positioned near the avatar of the subscriber initiating the message as shown in FIG. 13. This comment is also recorded in a show timeline 1401 with previous commentaries by an iconic comment symbol as depicted by references 1402-1408 of FIG. 14. If the subscriber selects one of these iconic comment symbols, the portal then presents an asynchronous presentation of the media program from the temporal location at which the temporal action took place depicting the call out at said temporal location. When this occurs, the subscriber is no longer viewing the media program synchronously with the other buddies.

Figure 16:
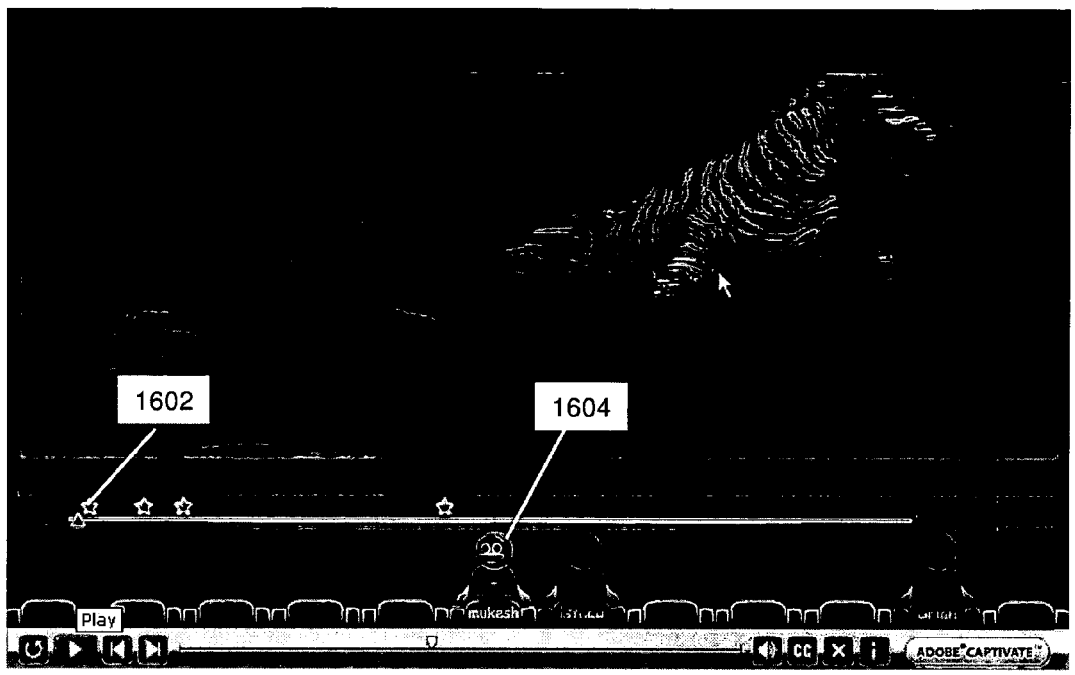

At step 714, the subscriber (and/or buddies) can invoke expressions and/or gestures of their respective avatars. This can be accomplished by selecting an icon 1501 which presents an expression and gesture list 1502-1504. The subscriber can alternatively enter a character sequence representative of the expression or gesture (e.g., :) which represents an expression of a smile). In this illustration, there are two selectable gestures 1502, and nine selectable expressions 1504. The gestures can be a thumbs up (representing approval) and thumbs down (representing disapproval) of the media program at the temporal location where the gesture is selected. The selectable expressions can include expressions of laughter, happiness, winking, drooling, confusion, huh?, sadness, shock, or anger. Other suitable gestures or expressions can be applied to the present disclosure without departure from the scope of the claims listed below. In this illustration, the expression of happiness has been selected for the avatar of Mukesh as shown in FIG. 16 by reference 1604.

Figure 17:
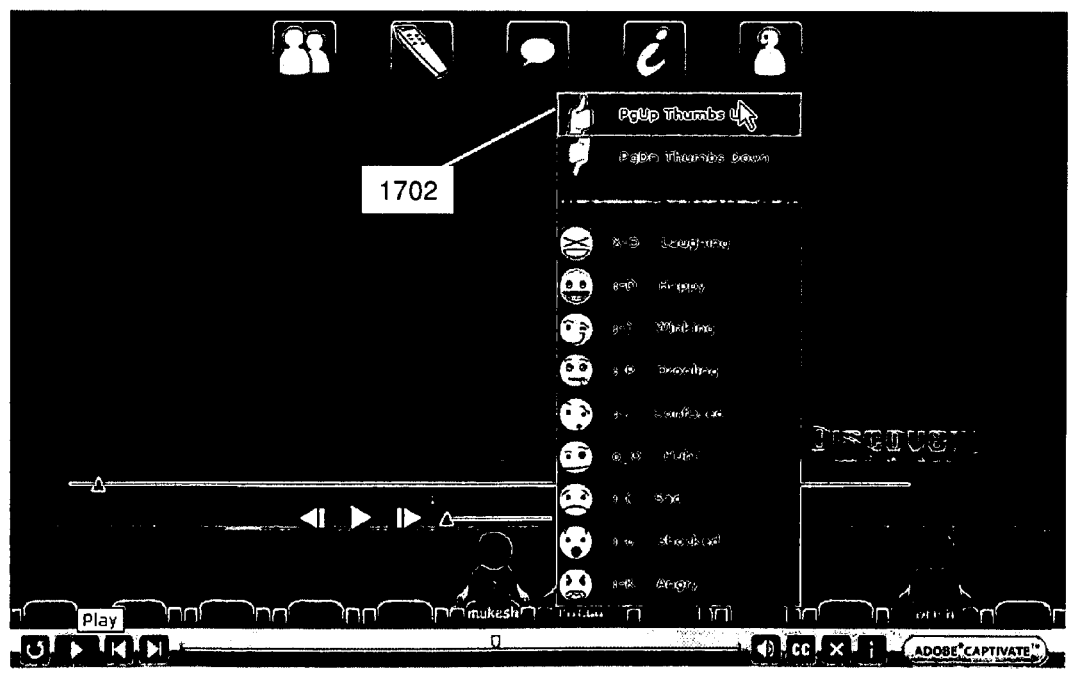
Figure 18:
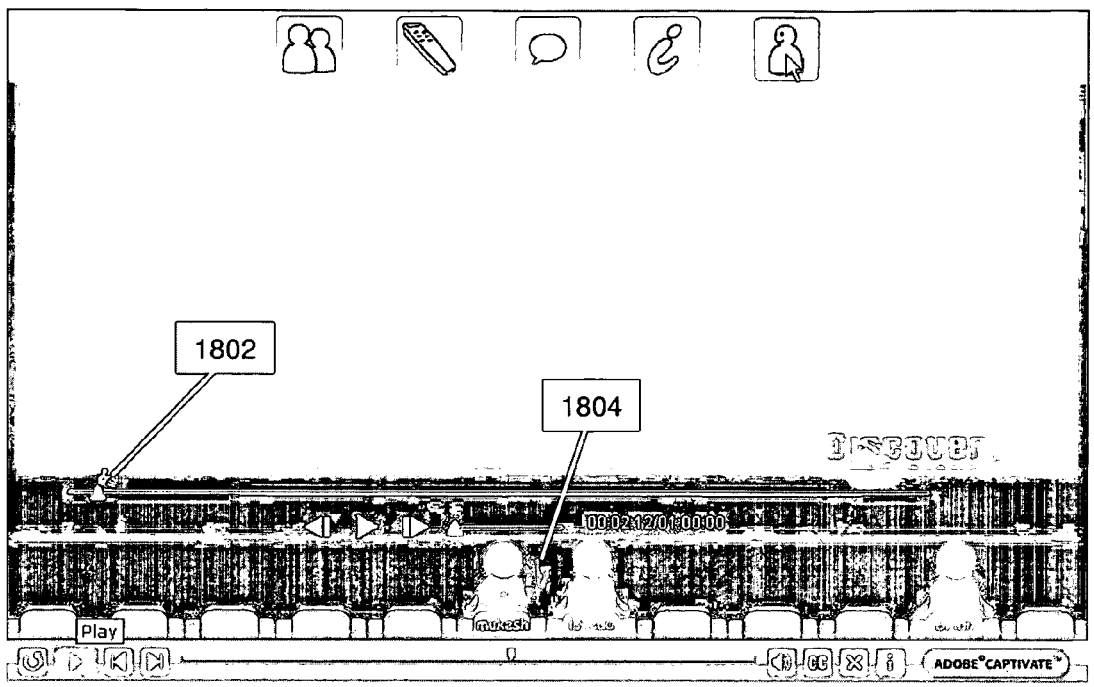

As before, temporal actions such as expressions can be recorded on the show time bar and can be depicted as selectable star symbols 1602. When a star symbol is selected, the subscriber is taken to the point in the presentation where the expression was made by the avatar of the buddy initiating the expression. When such a selection is made, the presentation of the media program becomes asynchronous to the subscriber relative to the other buddies. FIG. 17, shows the selection of a thumbs up gesture 1702. Responsive to selecting this gesture, the portal presents a selectable thumbs up icon 1802 on the show time line, and the avatar of Mukesh 1804 also shows a thumbs up gesture. When a thumbs up icon is selected by any of the participants viewing the media program, the portal generates for the viewer initiating the selection an asynchronous presentation of the media program at a time when the gesture was made.

Figure 19:
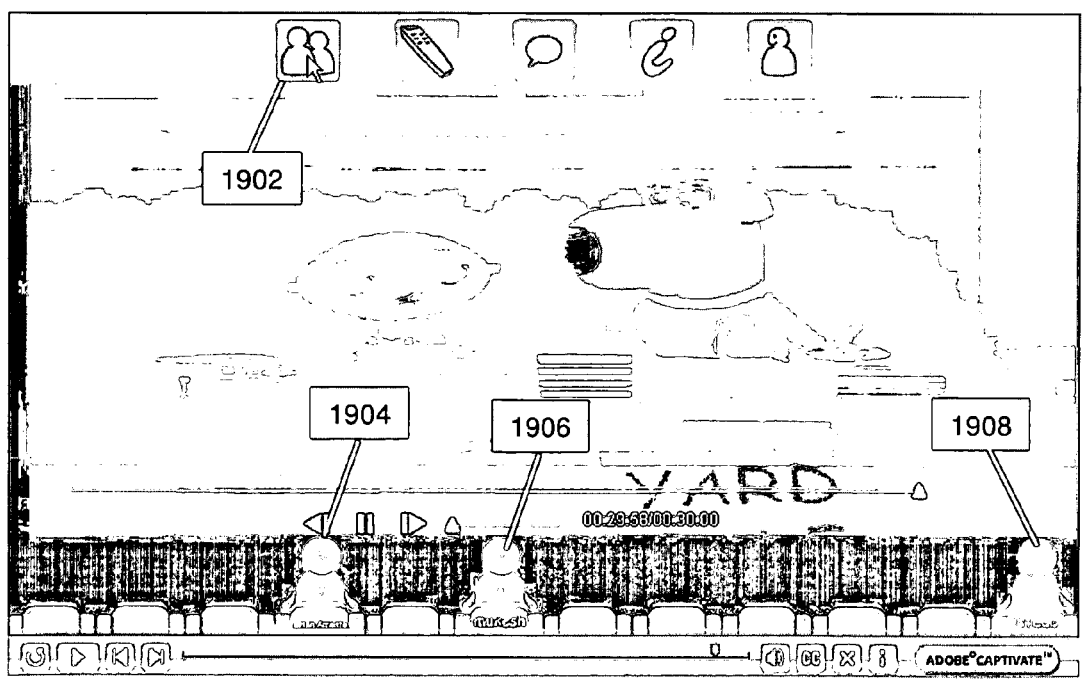
Figure 20:
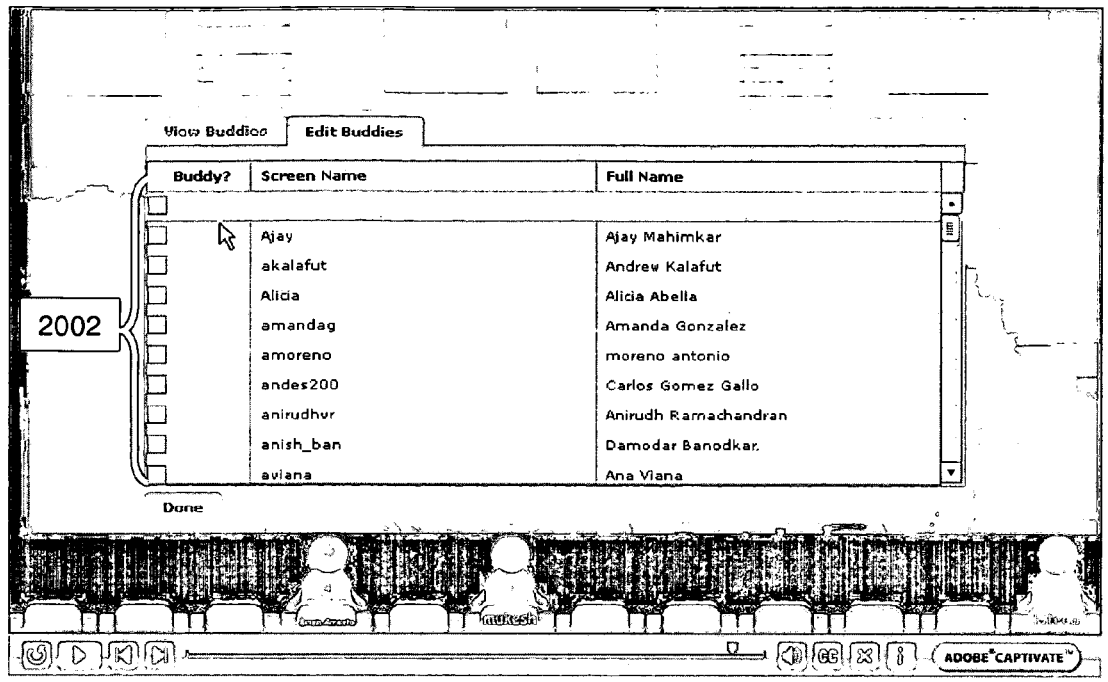
Figure 21:
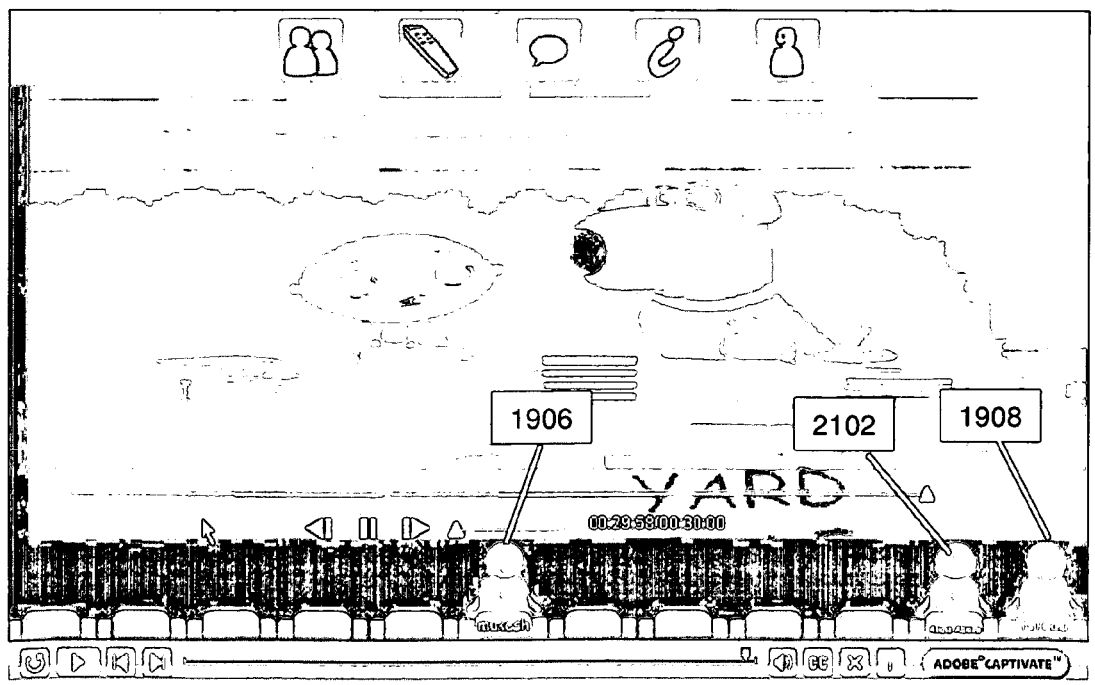
Figure 22:
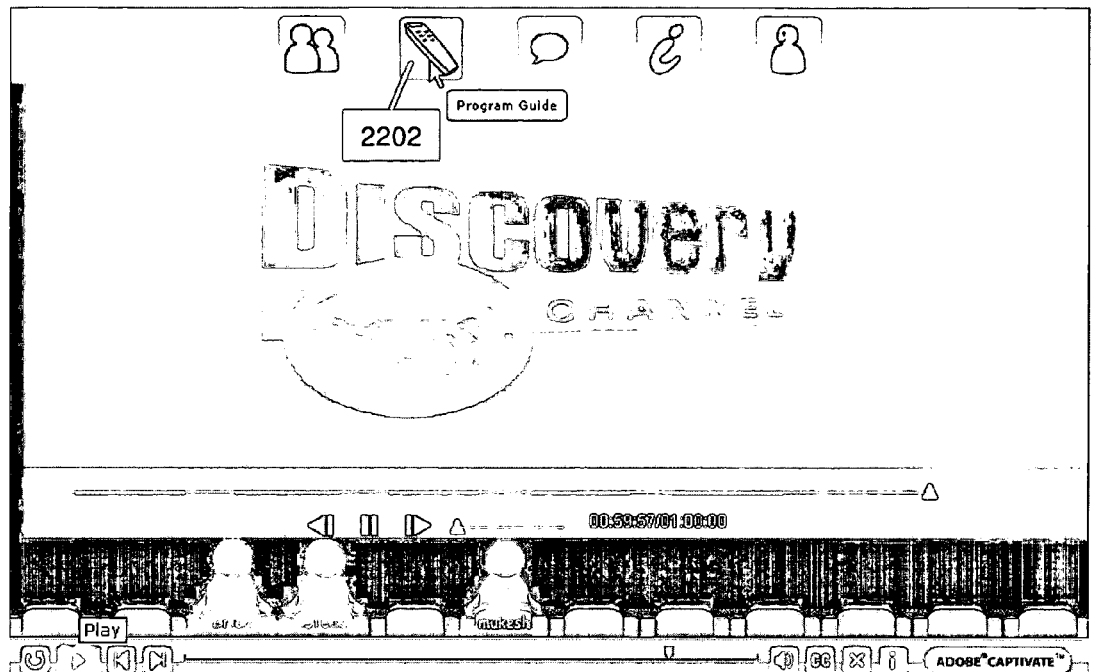

In step 718, the subscriber can choose to change buddies while synchronously viewing the media program with other buddies. This step can be represented by FIGS. 19-21. In FIG. 19 there are three buddies 1904-1908 (Brian, Mukesh, Lstead, respectively) initially viewing the media program. The subscriber can select the buddy icon 1902, which invokes in FIG. 20 a sub-GUI list 2002 identifying all the buddies who can be joined or removed from viewing the media program in question. Buddies with a checkmark remain in the virtual audience while buddies without a checkmark are removed from the virtual audience. Hence, by selecting and deselecting the buddies a new virtual audience can be created as shown in FIG. 21. In this illustration, the avatar for Brian (reference 1904) has been removed, and a new avatar 2102 (for subscriber: Alicia Abella) has been added to the virtual audience.

One or more of the foregoing steps of method 700 can generate corresponding temporal actions (comments, gestures, expressions, etc.) recorded by the portal in step 720 for viewing by buddies actively engaged in a synchronous viewing of the media program, and for buddies that asynchronous view the media program at subsequent times. The temporal actions can be recorded as metadata by the portal. The portal utilizes the metadata to create one or more symbolic overlays (e.g., virtual audience, show timeline, comment icons, call outs, gestures, expressions, etc.) which can be combined with the presentation of the media program without altering the original format of the media program. Over the course of one or more synchronous and/or asynchronous viewings of a media program by a plurality of subscribers, the portal can record metadata associated with temporal actions of each participant viewing the media program, and can combine metadata files recorded for each subscriber into an aggregate metadata archive that can be used to create a collective virtual collaborative experience.

Figure 23:
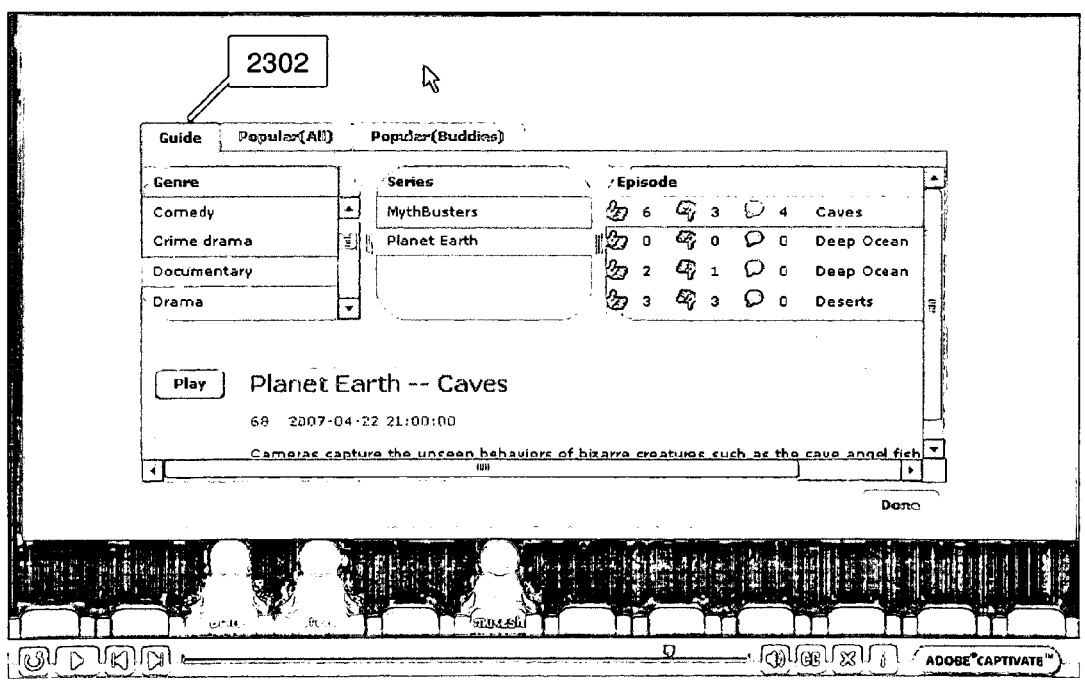
Figure 24:
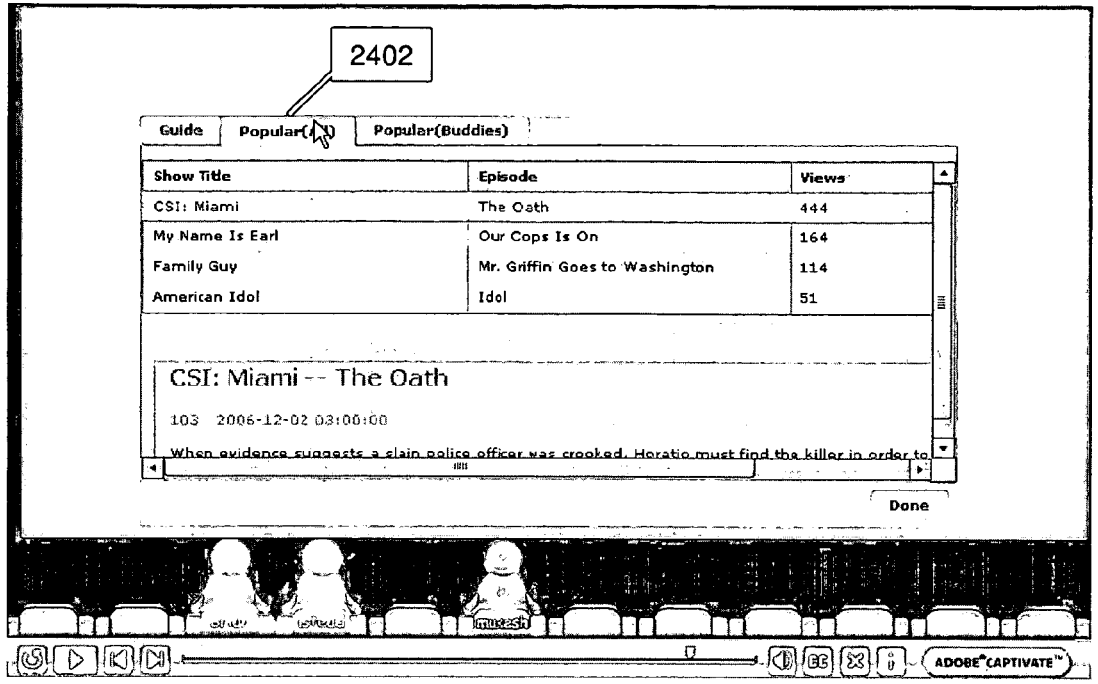
Figure 25:
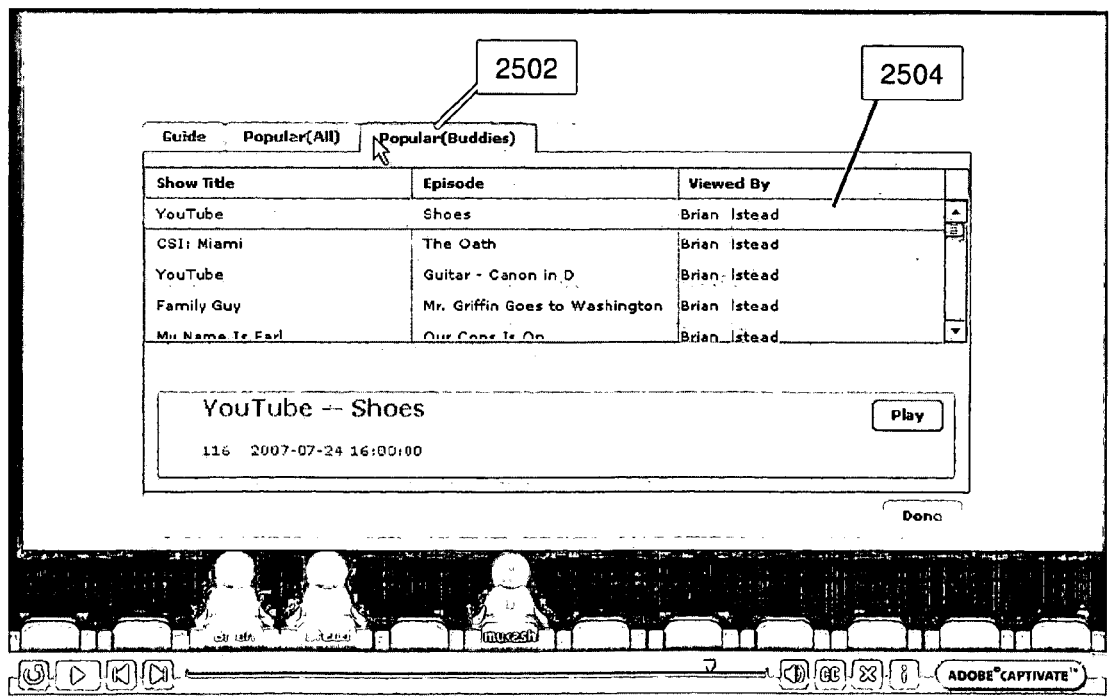
Figure 26:
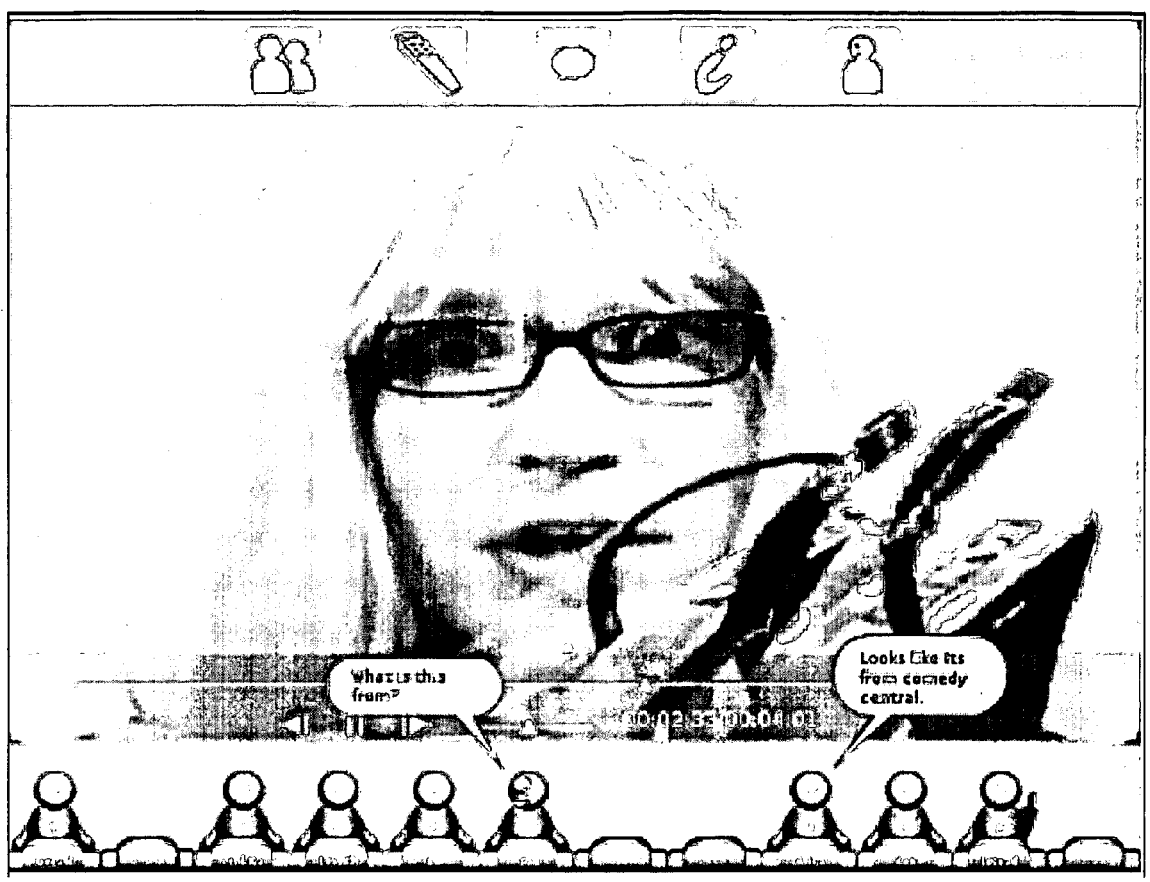

Referring back to step 708, suppose that instead of the subscriber selecting the buddy icon symbol 902 in FIG. 9, the subscriber selects the show guide icon symbol 904. In this instance, the subscriber would be presented in step 722 a show guide as shown in FIG. 23. The show guide can also be invoked at any instance of the GUI presentations of steps 710-720. For instance, the subscriber can select the show guide 2202 after starting a synchronous session with other buddies as demonstrated by FIG. 22. The show guide as depicted in FIG. 23, can be presented in three illustrative embodiments. A guide depicted by tab 2302 organizes media programs by genre, series, and episode with ratings (number of thumbs up/down entered by others, and number of commentaries made). In another illustrative embodiment, the subscriber can select another tab 2402, designated as Popular (All), which as depicted in FIG. 24 organizes a presentation of media programs by number of viewings (highest number of viewings is presented first). In yet another illustrative embodiment, the subscriber can select yet another tab 2502, designated as Popular(Buddies), which as depicted in FIG. 25 organizes a presentation of the most popular media programs by subscriber.

From any of these embodiments of the show guide, the subscriber can select in step 724 a media program of interest. The portal then presents in step 726 the selected media program asynchronously from other previous viewers. Suppose for example that the subscriber selects the media program, "Shoes", depicted by reference 2504 from Brian's popular list as shown in FIG. 25. From this selection, the portal presents in step 726 the "Shoes" media program in FIG. 26 highlighting in step 728 prerecorded expressions, commentary call-outs, and comment and expression icons on the show timeline. The subscriber can view the selected media program and experience the temporal actions of others who previously viewed the program. The subscriber can also add in step 730 his/her own temporal actions if desired for subsequent viewers to experience.

In sum, method 700 can be utilized by any system to collect synchronous and asynchronous temporal actions of a user experiencing a particular program without necessitating a synchronous experience of all participants. Method 700 thus provides a convenient means to collaborate experiences between users over the course of one or more presentations of a media program.

Figure 27:
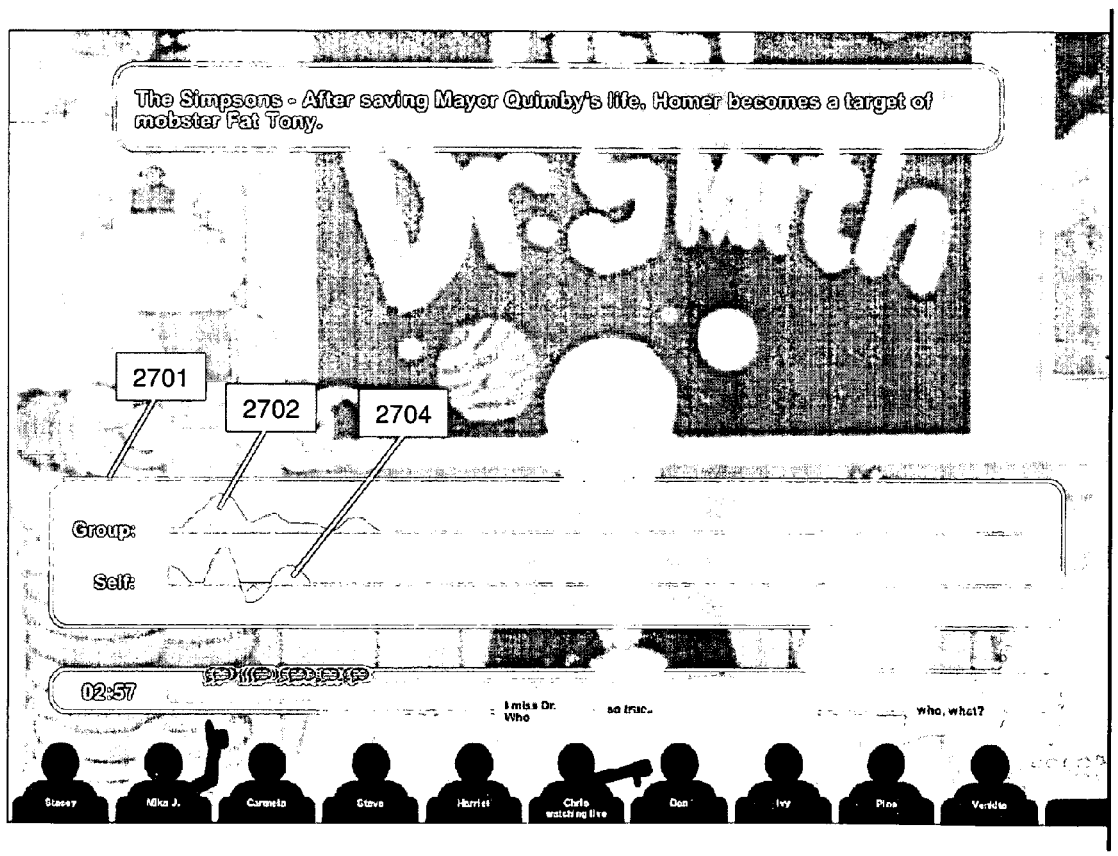

Upon reviewing the aforementioned embodiments, it would be evident to an artisan with ordinary skill in the art that said embodiments can be modified, reduced, or enhanced without departing from the scope and spirit of the claims described below. For example, method 700 can be adapted so that an experience graph 2701 such as shown in FIG. 27 can be overlaid on a media program to assist each viewer in identifying the sections of the media program where most temporal actions have taken place (see reference 2702) and where the viewer's own temporal actions have taken place (see reference 2704).

Figure 28:
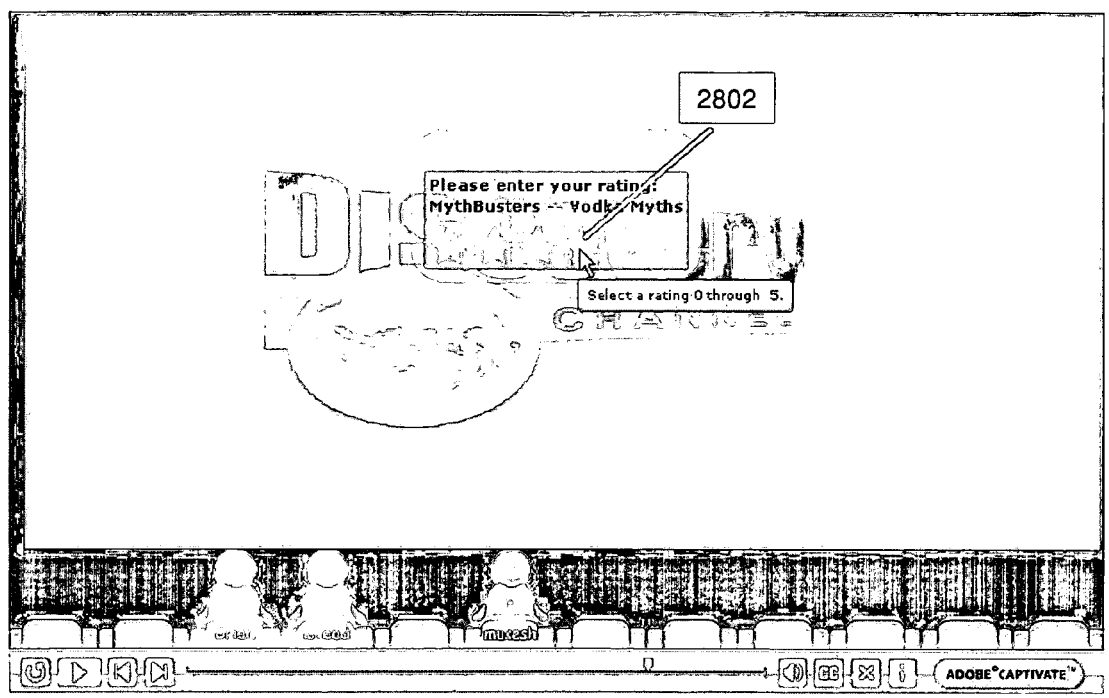
Figure 29:

In another embodiment, method 700 can be adapted so that a subscriber can rate media programs by a star (or other symbolic) rating system (see reference 2802 of FIG. 28). Subscriber ratings can be recorded by the portal and averaged between subscribers experiencing the same media program. The ratings can be presented by the portal in the show guide. In yet another embodiment, method 700 can be applied to a social network portal such as YouTube as shown illustratively in FIG. 29. In this embodiment, the social network portal can utilize the steps described in method 700 to enhance the social networking experience with symbolic overlays defined by a collective metadata archive of temporal actions of viewers to create a collaborative experience between them.

Figure 30:
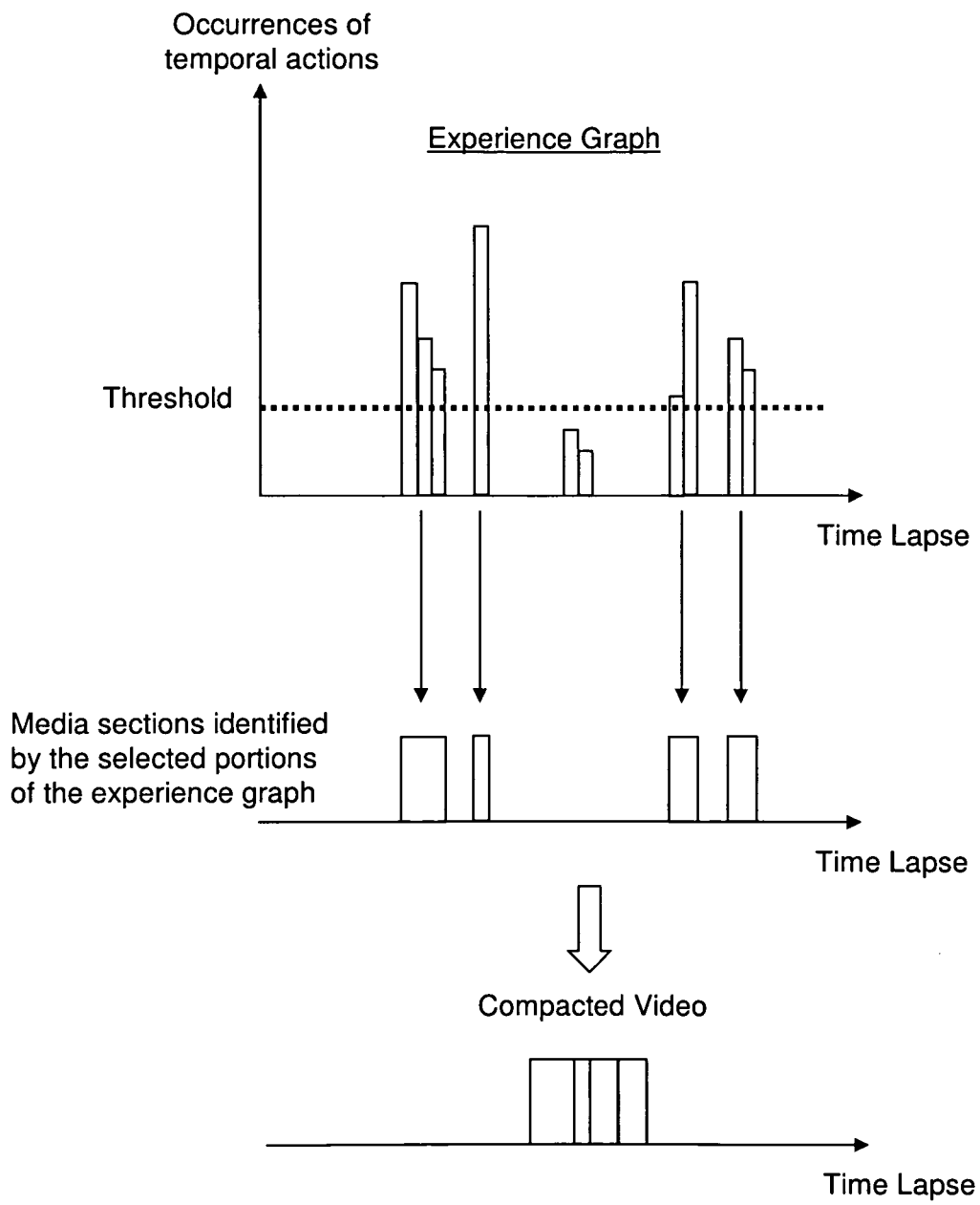

In another embodiment, method 700 can be adapted so that experience graphs can be used to compact media programs as shown in FIG. 30. In this illustration a histogram of occurrences of temporal actions of a plurality of viewers of a media program can be compared to a threshold established by a subscriber desiring to identify the most popular sections of a media program based on the temporal actions recorded for a plurality of viewers. If the occurrences of temporal actions exceed the threshold, the portal identifies corresponding sections of the media program with metadata. With this metadata, the portal can present a subscriber a compacted presentation of the most popular sections of the media program.

In yet another illustrative embodiment, method 700 can be adapted so that a content provider of a media program can establish one or more symbolic overlay conditions. These conditions can be incorporated as metadata in the media program. Accordingly, the portal can be directed to follow the symbolic overlay conditions as directed by the content provider. Symbolic overlay conditions can define a symbolic overlay design, and/or a policy to manage the presentation of temporal actions initiated by the subscribers viewing the media program. The symbolic overlay design can represent a symbolic overlay supplied by the content provider, which for example can be defined according to an extensible markup language (or XML). The content provider can thus define what the look and feel of a symbolic overlay can be. For example, avatars may have a particular look and feel, the background setting can be thematically selected by the content provider, and so on. Similarly, the policy can define as well as limit the temporal actions available to each subscriber. For example, the content provider can define new gestures (e.g., both hands raised as a Hooray! gesture), and/or new expressions (e.g., face turned 180 with the avatars tongue out). The content provider can remove some expressions such as drooling.

In yet another embodiment, method 700 can be adapted so that the portal can detect a pattern of behavior of a subscriber according to the one or more temporal actions. From the detected pattern, the portal create a behavioral profile of the subscriber which the service provider of the portal can utilize to tailor the subscriber's interest, among other possible applications.

It is further noted that method 700 can be applied to any form of media content including without limitation audio content, still image content, moving image content, or combinations thereof. Method 700 can also be applied in any suitable setting such as for example a training session, an academic lecture where students interchange thoughts, inquiries, commentaries, or other applicable settings.

Other suitable modifications can be applied to the present disclosure without departing from the scope of the claims below. Accordingly, the reader is directed to the claims section for a fuller understanding of the breadth and scope of the present disclosure.

Figure 31:
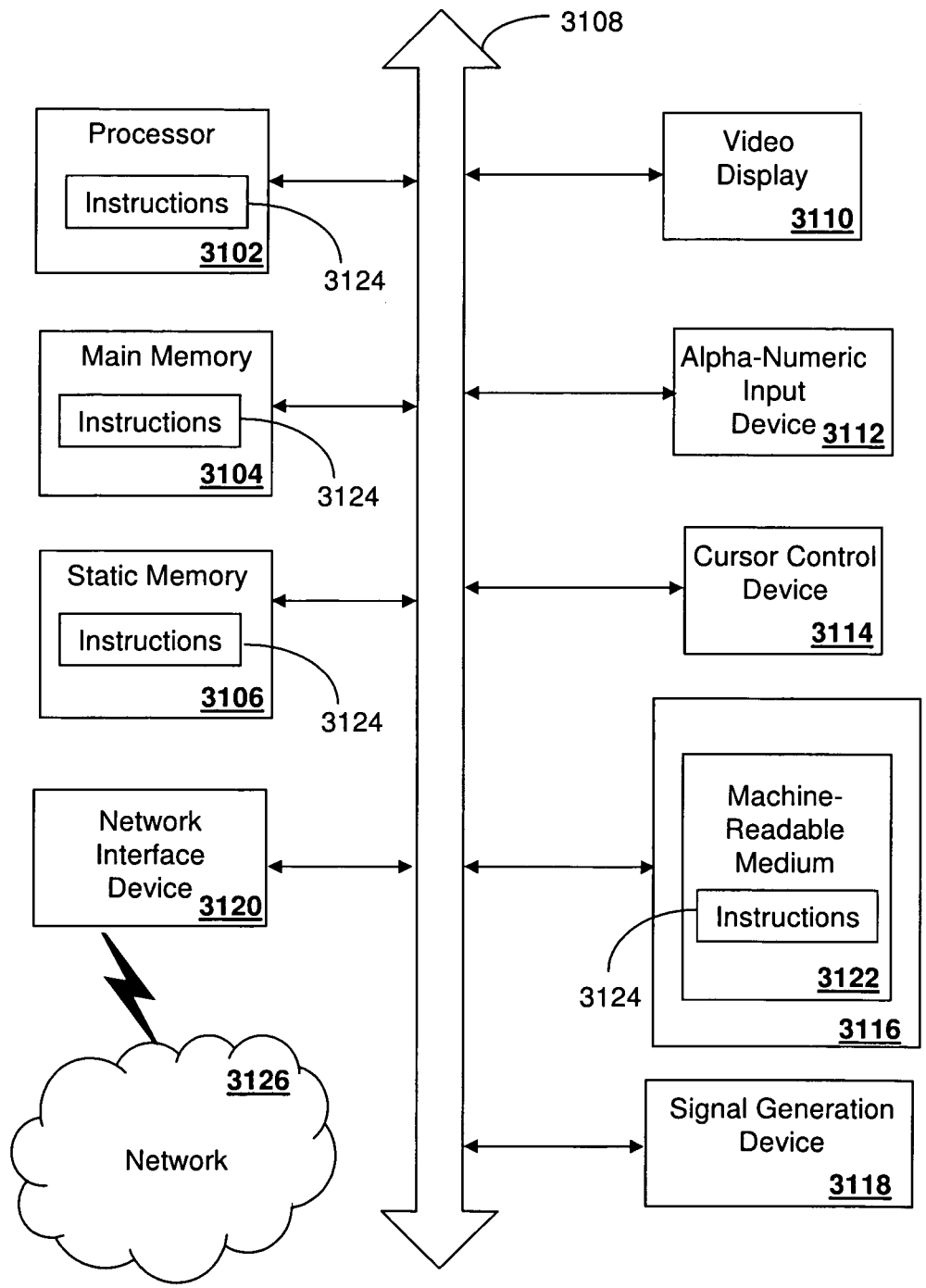
FIG. 31 is a diagrammatic representation of a machine in the form of a computer system within which a set of instructions, when executed, may cause the machine to perform any one or more of the methodologies discussed herein.

FIG. 31 depicts an illustrative diagrammatic representation of a machine in the form of a computer system 3100 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 3100 may include a processor 3102 (e.g., a central processing unit (CPU), a graphics processing unit (GPU, or both), a main memory 3104 and a static memory 3106, which communicate with each other via a bus 3108. The computer system 3100 may further include a video display unit 3110 (e.g., a liquid crystal display (LCD), a flat panel, a solid state display, or a cathode ray tube (CRT)). The computer system 3100 may include an input device 3112 (e.g., a keyboard), a cursor control device 3114 (e.g., a mouse), a disk drive unit 3116, a signal generation device 3118 (e.g., a speaker or remote control) and a network interface device 3120.

The disk drive unit 3116 may include a machine-readable medium 3122 on which is stored one or more sets of instructions (e.g., software 3124) embodying any one or more of the methodologies or functions described herein, including those methods illustrated above. The instructions 3124 may also reside, completely or at least partially, within the main memory 3104, the static memory 3106, and/or within the processor 3102 during execution thereof by the computer system 3100. The main memory 3104 and the processor 3102 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 3124, or that which receives and executes instructions 3124 from a propagated signal so that a device connected to a network environment 3126 can send or receive voice, video or data, and to communicate over the network 3126 using the instructions 3124. The instructions 3124 may further be transmitted or received over a network 3126 via the network interface device 3120.

While the machine-readable medium 3122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   identifying, by a system comprising a processor, a media program being presented at a first display device;
   receiving, by the system, a request from a second display device to establish synchronous presentation of the media program being presented at the first display device;
   synchronously presenting, by the system, the media program at the first display device and the second display device of a plurality of users;
   recording, by the system, a plurality of temporal actions initiated by equipment of the I plurality of users while the media program is presented;
   preparing, by the system, a graphical representation of occurrences of the plurality of temporal actions recorded during respective portions of the media program;
   receiving, by the system, from equipment of a user of the plurality of users, a selectable threshold number of occurrences of the plurality of temporal actions indicating popular portions of the media program;
   identifying, by the system, the respective popular portions of the media program with metadata for which the number of occurrences of the plurality of temporal actions exceeds the selectable threshold number of occurrences of the plurality of temporal actions; and
   preparing, by the system, a compacted presentation of the media program based on the metadata, wherein the compacted presentation comprises the respective popular portions of the media program for which the number of occurrences of the plurality of temporal actions initiated by the equipment of the plurality of users exceeds the selectable threshold number of occurrences of the plurality of temporal actions, and wherein a length of the compacted presentation is determined based on the selectable threshold.

2. The method of claim 1, wherein the media program comprises a video stream.

3. The method of claim 1, wherein the equipment of the user of the plurality of users initiates the presentation of the media program in synchronization with presentation of the media program with other users of the plurality of users, and wherein the method comprises:
   creating, by the system, a synchronous temporal action;
   creating, by the system, a synchronous symbolic overlay; and
   combining, by the system, in a single time line the synchronous presentation of the media program, the synchronous symbolic overlay, and the synchronous temporal action.

4. The method of claim 1, wherein the equipment of the user of the plurality of users asynchronously initiates the presentation of the media program, and wherein the method comprises:
   creating, by the system, an asynchronous temporal action;
   creating, by the system, an asynchronous symbolic overlay; and combining, by the system, in a single time line, the presentation of the media program, the asynchronous symbolic overlay, and the asynchronous temporal action.

5. The method of claim 1, comprising generating, by the system, the metadata for each temporal action of the plurality of temporal actions respectively initiated by the equipment of each user of the plurality of users, wherein the temporal actions of the plurality of temporal actions are selected from a group consisting of a textual commentary, an audio commentary, an emotional reaction, a gesture, an expression, a sketch, and a vote.

6. The method of claim 5, further comprising selecting, by the system, a symbolic overlay from one of an avatar representation of each respective user of the plurality of users or an image of each respective user of the plurality of users, wherein expression of each temporal action of the plurality of temporal actions are selected from one of the avatar representation of each respective user of the plurality of users or the image of each respective user of the plurality of users, wherein the gesture of the avatar corresponds to a motion of a body of the avatar, and wherein the expression of the avatar comprises an expression selected from a group of expressions consisting of shock, sadness, laughter, excitement, drooling, confusion, anger, and winking.

7. The method of claim 1, further comprising associating, by the system, a symbolic overlay with the equipment of each respective user of the plurality of users and wherein the symbolic overlay includes a depiction of the plurality of temporal actions.

8. The method of claim 7, wherein the depiction of the plurality of temporal actions comprises representation by iconic symbols.

9. The method of claim 8, wherein the depiction of a corresponding symbolic overlay is selectable by the equipment of a user of the plurality of users, and wherein the method further comprises:
   detecting, by the system, a selection of the depiction; and
   presenting, by the system, the temporal action of the user of the plurality of users associated with the depiction selected.

10. The method of claim 1, comprising assigning each user of the plurality of users to a buddy list, and wherein the method comprises:
   receiving from the equipment of each user of the plurality of users, authentication information; and
   responsive to validating of the authentication information, presenting to the equipment of each user of the plurality of users that is authenticated, an activity status of a portion of the buddy list.

11. The method of claim 10, wherein the activity status is selected from a group consisting of an identity of a user from the buddy list, an identity of the media program being presented to the user from the buddy list, and a time lapse since the presentation of the media program was initiated by the user from the buddy list.

12. The method of claim 11, comprising:
   detecting, by the system, a selection made by the equipment of the user of the plurality of users that is from the buddy list;
   identifying, by the system, one user from the buddy list associated with the selection;
   identifying, by the system, the media program being presented to the equipment of the user of the plurality of users that is authenticated, and the time lapse since the presentation was initiated; and
   presenting, by the system, to the equipment of the user of the plurality of users that is authenticated the media program synchronized to the presentation of the media program being presented.

13. The method of claim 1, comprising:
   detecting, by the system, a pattern of behavior for each user of the plurality of users according to the plurality of temporal actions initiated by the equipment of each user; and
   generating, by the system, a behavioral profile for each user of the plurality of users according to each user's detected pattern of behavior.

14. The method of claim 1, comprising notifying the equipment of the user of the plurality of users when the equipment of another user of the plurality of users initiates the temporal action.

15. The method of claim 1, comprising assigning the user of the plurality of users to a corresponding buddy list, wherein the buddy list is associated with a corresponding media program.

16. The method of claim 1, wherein the method is performed by a proxy server, wherein the media program is streamed to the proxy server from a media communication system, and wherein the media communication system is selected from a group consisting of a social networking portal, an internet protocol television communication system, a satellite television communication system, and a cable television communication system.

17. The method of claim 1, wherein the media program is supplied by a content provider, and wherein the metadata is inserted by the content provider in the media program corresponding to a condition of a symbolic overlay.

18. The method of claim 17, comprising:
   retrieving, by the system, the condition of the symbolic overlay from the media program; and
   managing, by the system, the presentation of the plurality of temporal actions according to the condition of the symbolic overlay.

19. The method of claim 18, wherein the condition of the symbolic overlay is selected from one of a symbolic overlay design, or a policy to manage the presentation of the plurality of temporal actions in the symbolic overlay.

20. The method of claim 19, wherein a design of the symbolic overlay is described according to an extensible markup language.

21. The method of claim 1, comprising presenting to the equipment of each user of the plurality of users a plurality of temporal occurrences of the plurality of temporal actions initiated by the equipment of the user of the plurality of users.

22. The method of claim 21, comprising:
   detecting, by the system, a selection by the equipment of the user of the plurality of users of a corresponding temporal occurrence of the plurality of temporal occurrences; and
   presenting to the equipment of the user making the selection, a portion of the media program associated with the temporal occurrence.

23. The method of claim 22, comprising compacting, by the system, a presentation length of the media program, resulting in the compacted presentation of the media program for presentation by the equipment of the user of the plurality of users according to the corresponding temporal occurrence of the plurality of temporal occurrences of the plurality of temporal actions initiated by the equipment of the user of the plurality of users.

24. The method of claim 23, wherein the preparing of the compacted presentation of the media program comprises:

extracting, by the system, a plurality of the popular portions of the media program, wherein each popular portion of the plurality of the popular portions of the media program is associated with the corresponding temporal occurrence of the plurality of temporal occurrences that exceeds the selectable threshold; and generating, by the system, the compacted presentation of the media program by concatenating the plurality of the popular portions of the media program that are extracted by the system.

25. The method of claim 1, comprising presenting, by the equipment of the user of the plurality of users, the plurality of temporal actions initiated by the equipment of the user of the plurality of users, responsive to receiving a request from the equipment of said user.

26. The method of claim 1, comprising presenting, by the equipment of the user of the plurality of users, a media guide, wherein the media guide comprises entries selected from a group consisting of a list of media programs indicating a frequency of consumption by the plurality of users, a list of media programs available for presentation, and a rating of the media programs available for presentation.

27. A system, comprising:
a memory that stores executable instructions; and
a controller coupled to the memory, wherein the controller, responsive to executing the instructions, facilitates performance of operations comprising:
identifying a media program being presented at a first display device of a first user of a plurality of users;
receiving a request from equipment of a second user of the plurality of users to establish synchronous presentation at a second display device of the media program being presented at the first display device;
recording a plurality of temporal actions initiated by equipment of the first and the second users of the plurality of users while synchronously presenting at the first and second display devices of the first and second users of the plurality of users the media program to define a plurality of collected temporal actions, wherein an audience comprises a group of users of the plurality of users who mutually agree to view the media program being presented synchronously as part of the audience;
preparing a histogram of occurrences of the plurality of collected temporal actions recorded during respective portions of the media program;
receiving from the equipment of the first and the second users of the plurality of users, a selectable threshold number of occurrences collected temporal actions of the plurality of the collected of temporal actions indicating popular portions of the media program;
identifying the respective popular portions of the media program with metadata for which the number of occurrences of the plurality of the collected temporal actions exceeds the selectable threshold number of occurrences of the plurality of the collected temporal actions; and
preparing a compacted presentation of the media program according to the metadata, wherein the compacted presentation of the media program comprises the respective popular portions of the media program for which the number of occurrences of the plurality of the collected temporal actions initiated by the equipment of the plurality of users exceeds the selectable threshold number of occurrences of the plurality of the collected temporal actions, wherein a length of the compacted presentation is determined according to the selectable threshold.

28. The system of claim 27, wherein the media program is selected from a group consisting of a video stream, an audio stream, and a sequence of still images, a sequence of text images, and wherein the controller performs operations comprising presenting the media program at the equipment of each user at a corresponding time initiated by each user.

29. The system of claim 28, wherein the equipment of a user of the audience initiates a synchronous presentation of the media program, and wherein the operations further comprise:
generating a synchronous temporal action;
generating a synchronous symbolic overlay; and
combining in a single timeline the synchronous presentation of the media program, the synchronous symbolic overlay, and the synchronous temporal action.

30. The system of claim 28, wherein the equipment of a user of the audience initiates an asynchronous presentation of the media program, and wherein the operations further comprise:
generating an asynchronous temporal action;
generating an asynchronous symbolic overlay; and
combining in a single timeline the asynchronous presentation of the media program, the asynchronous symbolic overlay, and the asynchronous temporal action.

31. A machine-readable storage device, comprising executable instructions, that when executed by a processor, facilitate performance of operations comprising:
identifying a media program being presented at a first display device of a first user of a plurality of users;
receiving a request from equipment of a second user of the plurality of users to establish synchronous presentation at a second display device of the media program being presented at the first display device;
combining in a single time line a presentation of the media program with a presentation of a plurality of temporal actions collected solely from the equipment of the first and the second users of the plurality of users to generate a combined presentation of the media program while presenting the media program to respective display devices of the plurality of users, wherein the plurality of temporal actions comprises a bilateral communication exchange between equipment of multiple users of the plurality of users who mutually agree to view the media program being presented synchronously;
preparing a histogram of a collection of occurrences of the plurality of temporal actions recorded during respective portions of the media program;
receiving from the equipment of one of the first or the second user of the plurality of users, a selectable threshold number of occurrences of the plurality of the temporal actions indicating popular portions of the media program;
identifying the respective popular portions of the media program with metadata for which the number of occurrences of the plurality of the temporal actions exceeds the selectable threshold number of occurrences of the plurality of the temporal actions; and
preparing a compacted presentation of the media program according to the metadata, wherein the compacted presentation comprises the respective popular portions of the media program for which the collection of the number of occurrences of the plurality of the temporal actions initiated by the equipment of the plurality of users exceeds the selectable threshold number of occurrences of the plurality of the temporal actions, wherein a length of the compacted presentation is determined according to the selectable threshold.

32. The machine-readable storage device of claim 31, wherein the media program is selected from a group consisting of a video stream, an audio stream, a sequence of still images, and a sequence of text images, and wherein the operations further comprise presenting the media program to the equipment of each user of the plurality of users at a corresponding time initiated by each user of the plurality of users.

33. The machine-readable storage device of claim 32, wherein the equipment of each user of the plurality of users synchronously initiates the presentation of the media program, and wherein the operations further comprise:
- generating a synchronous temporal action;
- generating a synchronous symbolic overlay; and
- combining in a single timeline the synchronous presentation of the media program, the synchronous symbolic overlay, and the synchronous temporal action.

34. The machine-readable storage device of claim 32, wherein the equipment of each user of the plurality of users initiates an asynchronous presentation of the media program, and wherein the operations further comprise:
- generating an asynchronous temporal action;
- generating an asynchronous symbolic overlay; and
- combining in a single timeline the asynchronous presentation of the media program, the asynchronous symbolic overlay, and the asynchronous temporal action.

* * * * *